(12) United States Patent
Mishra et al.

(10) Patent No.: US 12,706,856 B2
(45) Date of Patent: Aug. 11, 2026

(54) PIM PROXY OVER EVPN FABRIC

(71) Applicant: Cisco Technology, Inc., San Jose, CA (US)

(72) Inventors: Mankamana Prasad Mishra, San Jose, CA (US); Nitin Kumar, San Jose, CA (US); Ali Sajassi, Alamo, CA (US); Swadesh Agrawal, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 38 days.

(21) Appl. No.: 18/985,763

(22) Filed: Dec. 18, 2024

(65) Prior Publication Data

US 2025/0119389 A1 Apr. 10, 2025

Related U.S. Application Data

(63) Continuation of application No. 18/298,552, filed on Apr. 11, 2023, now Pat. No. 12,244,509.

(51) Int. Cl.

| | |
|---|---|
| ***H04L 12/18*** | (2006.01) |
| ***H04L 45/00*** | (2022.01) |
| ***H04L 45/02*** | (2022.01) |
| ***H04L 45/50*** | (2022.01) |
| ***H04L 47/32*** | (2022.01) |

(52) U.S. Cl.
CPC ............ *H04L 47/32* (2013.01); *H04L 12/185* (2013.01); *H04L 12/1863* (2013.01); *H04L 45/026* (2013.01); *H04L 45/34* (2013.01); *H04L 45/50* (2013.01)

(58) Field of Classification Search
CPC ... H04L 47/32; H04L 12/185; H04L 12/1863; H04L 45/026; H04L 45/34; H04L 45/50; H04L 45/16
See application file for complete search history.

(56) References Cited

U.S. PATENT DOCUMENTS

| | | | | |
|---|---|---|---|---|
| 7,899,928 | B1 * | 3/2011 | Naik | H04L 12/4625 709/239 |
| 7,925,778 | B1 * | 4/2011 | Wijnands | H04L 45/04 370/392 |
| 7,957,386 | B1 * | 6/2011 | Aggarwal | H04L 12/18 370/392 |
| 9,100,201 | B1 * | 8/2015 | Pichumani | H04L 12/4641 |
| 9,948,472 | B2 * | 4/2018 | Drake | H04L 12/18 |
| 10,033,539 | B1 * | 7/2018 | Nagarajan | H04L 45/16 |
| 10,305,818 | B2 * | 5/2019 | Ranns | H04L 45/28 |
| 10,999,195 | B1 * | 5/2021 | Suryanarayana | H04L 12/4633 |
| 11,881,962 | B2 * | 1/2024 | Pai | H04L 45/16 |
| 11,902,148 | B2 * | 2/2024 | N | H04L 45/50 |

(Continued)

*Primary Examiner* — Anthony Mejia
*Assistant Examiner* — Hassan Abdur-Rahman Khan
(74) *Attorney, Agent, or Firm* — Polsinelli P.C.

(57) ABSTRACT

A system and associated methods provide solutions for reducing a volume of traffic through a multicast network attributed to repeated maintenance messages, which are required in order to maintain a multicast connection. The system configures provider edge devices to generate and send maintenance messages on behalf of members of a multicast group to establish and maintain the multicast connection and provides options for determining unknown locations of sources and/or subscribers, thereby reducing the overall volume of traffic transmitted over the multicast network.

20 Claims, 14 Drawing Sheets

(56) References Cited

U.S. PATENT DOCUMENTS

2005/0152370 A1* 7/2005 Meehan .............. H04L 12/5601 370/393
2006/0088031 A1* 4/2006 Nalawade ........... H04L 12/4641 370/428
2006/0182122 A1* 8/2006 Davie ................. H04L 12/2854 370/395.53
2010/0290478 A1* 11/2010 Xia ......................... H04L 45/38 370/401
2011/0286450 A1* 11/2011 Wijnands ................ H04L 45/04 370/390
2012/0127994 A1* 5/2012 Ko .......................... H04L 45/16 370/390
2013/0061034 A1* 3/2013 Walheim, Sr. ...... H04L 63/0272 713/150
2016/0006646 A1* 1/2016 Lin ..................... H04L 12/6418 370/390
2017/0171061 A1* 6/2017 Tessmer ................ H04L 12/462
2019/0190734 A1* 6/2019 Shen ....................... H04L 12/46
2019/0229937 A1* 7/2019 Nagarajan ............... H04L 12/18
2020/0245206 A1* 7/2020 Allan ...................... H04L 45/04
2020/0280455 A1* 9/2020 Mishra .................... H04L 45/16
2020/0287737 A1* 9/2020 Mishra ................ H04L 12/4675
2021/0014159 A1* 1/2021 Mishra .................. H04L 45/741
2021/0058260 A1* 2/2021 Xia ..................... H04L 12/4633
2021/0266189 A1* 8/2021 Xie ..................... H04L 12/4641
2021/0409242 A1* 12/2021 Xie ......................... H04L 45/04
2022/0060344 A1* 2/2022 Zheng ................. H04L 61/5007
2022/0173919 A1* 6/2022 Mishra .................... H04L 45/16
2022/0224633 A1* 7/2022 Xie ......................... H04L 45/03
2022/0337521 A1* 10/2022 Xie ..................... H04L 12/4633
2022/0417059 A1* 12/2022 Nalagatla .............. H04L 12/185
2023/0155932 A1* 5/2023 Zhang ..................... H04L 45/34 709/238
2024/0275714 A1* 8/2024 Qiu ......................... H04L 45/50
2024/0348553 A1 10/2024 Mishra et al.

* cited by examiner

PIM PROXY OVER EVPN FABRIC

CROSS REFERENCE TO RELATED APPLICATIONS

This application is a continuation of U.S. patent application Ser. No. 18/298,552 filed on Apr. 11, 2023, the content of which is incorporated by reference in its entirety.

BACKGROUND

Multicast networks ensure steady streams of content delivery by providing a multicast group including a plurality of redundant sources that communicate with a network. These redundant sources can be at completely different geographic locations. One benefit to multicast networks is that when a source delivering content fails, another redundant source is available to take its place. However, multicast networks require maintenance messages to be sent and received at regular intervals to set up and maintain multicast connections; this requirement can lead to the flooding of multicast networks with repeated maintenance messages, reducing available bandwidth for content.

BRIEF DESCRIPTION OF THE SEVERAL VIEWS OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
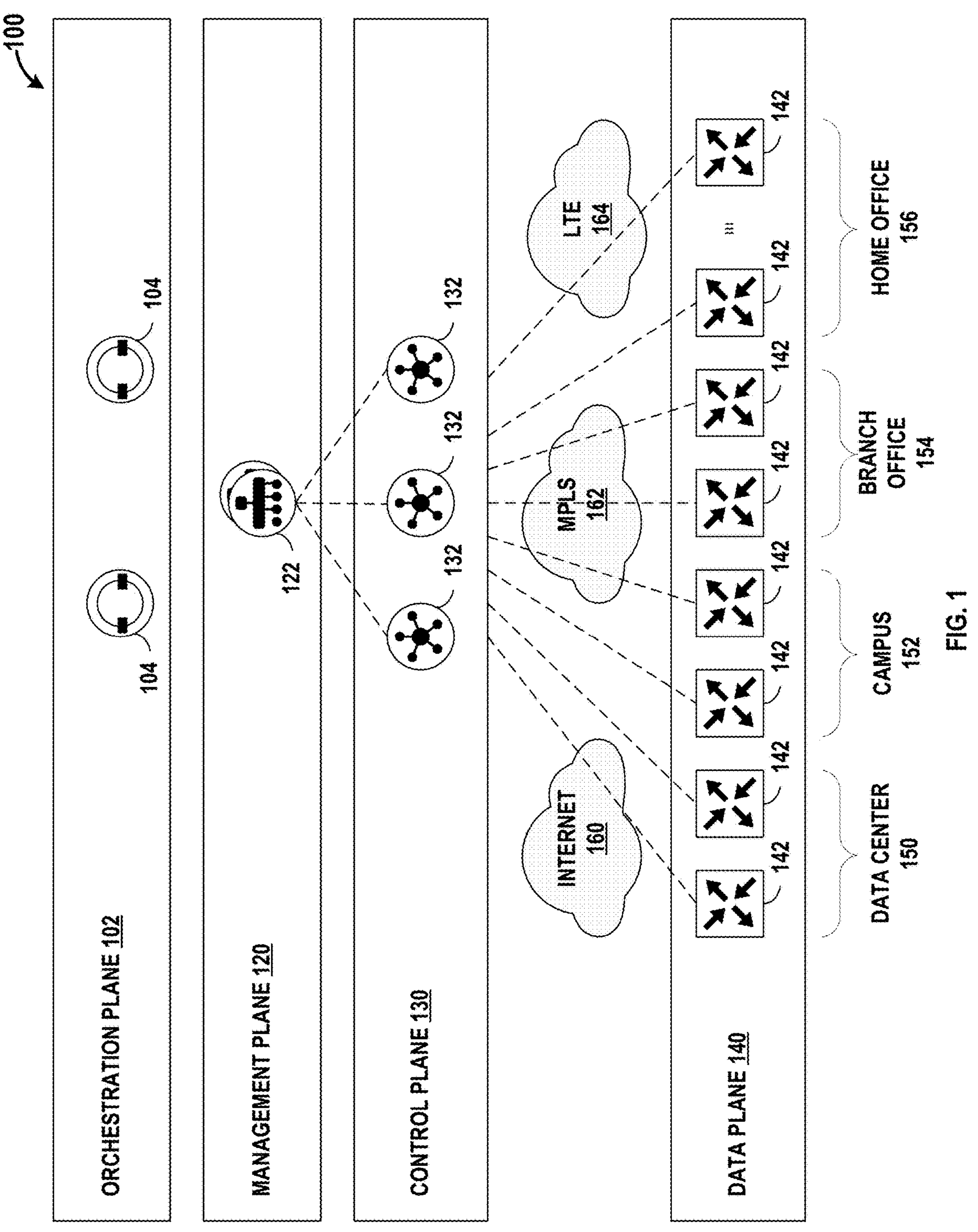
FIG. 1 illustrates an example of a high-level network architecture in accordance with some aspects of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Multicast networks ensure steady streams of content delivery by providing a multicast group including a plurality of redundant sources that communicate with a network. These redundant sources can be at completely different geographic locations. One benefit to multicast networks is that when a source delivering content fails, another redundant source is available to take its place. However, multicast networks require maintenance messages to be sent and received at regular intervals to set up and maintain multicast connections; this requirement can lead to the flooding of multicast networks with repeated maintenance messages, reducing available bandwidth for content.

Techniques described herein provide procedures for reducing traffic through a multicast network by configuring provider edge routers or devices associated with sources and subscribers of a multicast group as Protocol-Independent Multicast (PIM) proxies to generate and send maintenance messages on behalf of the subscribers. Methods of identifying correct source and subscriber locations are also provided to avoid flooding through the multicast network.

In one aspect, a method for reducing a volume of multicast maintenance messages transmitted across a multi-protocol label switching (MPLS) network includes: receiving, by a first provider edge router of a first autonomous system, wherein the first provider edge router has been configured as a first multicast router proxy, a first multicast maintenance message destined for a multicast group member that is in a second autonomous system having a second provider edge router; dropping, by the first provider edge router, the first multicast maintenance message; and generating and transmitting, by the second provider edge router, a second multicast maintenance message to the multicast group member, wherein the second multicast maintenance message is a substitute for the first multicast maintenance message.

In some examples, the first multicast maintenance message is a first hello message from a source of a multicast group, and the second multicast message is a second hello message to a subscriber to the multicast group.

In other examples, the first multicast maintenance message is a first join message from a subscriber to a multicast group, and the second multicast message is a second join message to a source of the multicast group.

In cases where the first multicast maintenance message is the first join message, and if the source is not yet known, after the first provider edge router receives the first join message from the first subscriber, the method can further include: determining, by the first provider edge router, that a location of the source of the multicast group is unknown; learning, by the first provider edge router, the location of the source of the multicast group using a border gateway protocol; recording, by the first provider edge router, a segment route through multi-protocol label switching (MLPS) network to the source in the multicast group in a routing table on the first provider edge router; transmitting, by the first provider edge router, a message to the second provider edge router over the segment route notifying the second provider edge router that the subscriber is joining the multicast group where the source is located on the second autonomous system serviced by the second provider edge router; and configuring the second provider edge router to periodically generate and transmit the second join message to keep the subscriber in the multicast group.

In cases where the first multicast maintenance message is the first join message, and if the source is already known, after the first provider edge router receives the first join message from the first subscriber, the method can further include: determining, by the first provider edge router, that a location of the source of the multicast group is known and recorded in a routing table on the first provider edge router; transmitting, by the first provider edge router, a message to the second provider edge router over the segment route notifying the second provider edge router that the subscriber is joining the multicast group where the source is located on the second autonomous system serviced by the second provider edge router; and configuring the second provider edge router to periodically generate and transmit the second join message to keep the subscriber in the multicast group.

Following joining the multicast group, the method can further include: receiving, by the first provider edge router of the first autonomous system, a multicast content message; determining, by the first provider edge router, the subscriber to the multicast group to receive the multicast content message; and forwarding, by the first provider edge router, the multicast content message to the subscriber to the multicast group using a respective segment route associated with the subscriber to the multicast group.

In cases where the first multicast maintenance message is the first join message, and the location of the subscriber is unknown, the method can include: learning, by the first provider edge router, the location of the subscriber of the multicast group based on first join message; recording, by the first provider edge router, that a source for the multicast group is located in the second autonomous system; and recording, by the first provider edge router, a segment route through multi-protocol label switching (MLPS) network to the subscriber of the multicast group in a routing table on the first provider edge router.

In another aspect, a system for reducing a volume of multicast maintenance messages transmitted across a multi-protocol label switching (MPLS) network includes a processor in communication with a memory and including instructions executable by the processor to: receive, by a first provider edge router of a first autonomous system, wherein the first provider edge router has been configured as a first multicast router proxy, a first multicast maintenance message destined for a multicast group member that is in a second autonomous system having a second provider edge router; drop, by the first provider edge router, the first multicast maintenance message; and generate and transmit, by the second provider edge router, a second multicast maintenance message to the multicast group member, wherein the second multicast maintenance message is a substitute for the first multicast maintenance message.

In another aspect, one or more non-transitory computer-readable media includes computer-readable instructions, which when executed by one or more processors of a provider edge device, cause the provider edge device to: receive, by a first provider edge router of a first autonomous system, wherein the first provider edge router has been configured as a first multicast router proxy, a first multicast maintenance message destined for a multicast group member that is in a second autonomous system having a second provider edge router; drop, by the first provider edge router, the first multicast maintenance message; and generate and transmit, by the second provider edge router, a second multicast maintenance message to the multicast group member, wherein the second multicast maintenance message is a substitute for the first multicast maintenance message.

EXAMPLE EMBODIMENTS

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The disclosed technology addresses the need in the art for methods to reduce traffic volume attributed to repeated maintenance messages being sent over an Ethernet VPN (EVPN) network. In current multicast EVPN technologies, when establishing a connection between a source and a subscriber of a multicast group, where there is an EVPN network connecting a router in front of a host to a router in front of a multicast subscriber, join messages are sent to more than one provider edge device (including those that are not associated with the source), which can flood the network core with unnecessary traffic. Further, once a multicast connection between the source and subscriber are established, current multicast EVPN technologies require repeated maintenance messages (e.g., "hello" messages) to be sent and received between the subscriber and the source over the multicast network, which can also flood the EVPN network with unnecessary traffic. Current protocol extensions do not provide options to reduce the traffic volume created by repeated maintenance messages.

A used herein the term "configured" shall be considered to interchangeably be used to refer to configured and configurable, unless the term "configurable" is explicitly used to distinguish from "configured". The proper understanding of the term will be apparent to persons of ordinary skill in the art in the context in which the term is used.

A computer network is a geographically distributed collection of nodes interconnected by communication links and segments for transporting data between end nodes, such as personal computers and workstations, or other network devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other.

Since management of interconnected computer networks can prove burdensome, smaller groups of computer networks may be maintained as routing domains or autonomous systems. An autonomous system is a network or group of networks under common administration and with common routing policies. A typical example of an autonomous system is a network administered and maintained by an Internet Service Provider (ISP). Customer networks, such as universities or corporations, connect to the ISP, and the ISP routes the network traffic originating from the customer networks to network destinations that may be in the same ISP or may be reachable only through other ISPs.

To facilitate the routing of network traffic through one or more autonomous systems, the network elements of the autonomous systems need to exchange routing information to various network destinations. Border Gateway Protocol (BGP) is an Exterior Gateway Protocol (EGP) that is used to exchange routing information among network elements (e.g., routers) in the same or different autonomous systems. A computer host that executes a BGP process is typically referred to as a BGP host or a BGP network device. To exchange BGP routing information, two BGP hosts, or peers, first establish a transport protocol connection with one another. Initially, the BGP peers exchange messages to open a BGP session, and, after the BGP session is open, the BGP peers exchange their entire routing information. Thereafter, only updates or changes to the routing information are exchanged, or advertised, between the BGP peers. The exchanged routing information is maintained by the BGP peers during the existence of the BGP session.

The networks within an autonomous system are typically coupled together by conventional "intradomain" routers configured to execute intradomain routing protocols, and are generally subject to a common authority. To improve routing scalability, a service provider (e.g., an ISP) may divide an autonomous system into multiple "areas" or "levels." It may be desirable, however, to increase the number of nodes capable of exchanging data; in this case, interdomain routers executing interdomain routing protocols are used to interconnect nodes of the various autonomous systems. Moreover, it may be desirable to interconnect various autonomous systems that operate under different administrative domains. As used herein, an autonomous system, area, or level is generally referred to as a "domain."

FIG. 1 illustrates an example of a network architecture 100 for implementing aspects of the present technology. An example of an implementation of the network architecture 100 is the Cisco® SD-WAN architecture. However, one of ordinary skill in the art will understand that, for the network architecture 100 and any other system discussed in the present disclosure, there can be additional or fewer components in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the network architecture 100 can comprise an orchestration plane 102, a management plane 120, a control plane 130, and a data plane 140. The orchestration plane can 102 assist in the automatic on-boarding of edge network devices 142 (e.g., switches, routers, etc.) in an overlay network. The orchestration plane 102 can include one or more physical or virtual network orchestrator appliances 104. The network orchestrator appliance(s) 104 can perform the initial authentication of the edge network devices 142 and orchestrate connectivity between devices of the control plane 130 and the data plane 140. In some embodiments, the network orchestrator appliance(s) 104 can also enable communication of devices located behind Network Address Translation (NAT). In some embodiments, physical or virtual Cisco® SD-WAN vBond appliances can operate as the network orchestrator appliance(s) 104.

The management plane 120 can be responsible for the central configuration and monitoring of a network. The management plane 120 can include one or more physical or virtual network management appliances 122. In some embodiments, the network management appliance(s) 122 can provide centralized management of the network via a graphical user interface to enable a user to monitor, configure, and maintain the edge network devices 142 and links (e.g., Internet transport network 160, Multiprotocol Label Switching (MPLS) network 162, 4G/LTE network 164) in an underlay and overlay network. The network management appliance(s) 122 can support multi-tenancy and enable centralized management of logically isolated networks associated with different entities (e.g., enterprises, divisions within enterprises, groups within divisions, etc.). Alternatively or in addition, the network management appliance(s) 122 can be a dedicated network management system for a single entity. In some embodiments, physical or virtual Cisco® SD-WAN vManage appliances can operate as the network management appliance(s) 122.

The control plane 130 can build and maintain a network topology and make decisions on where traffic flows. The control plane 130 can include one or more physical or virtual network controller appliance(s) 132. The network controller appliance(s) 132 can establish secure connections to each network device 142 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the network controller appliance(s) 132 can operate as route reflectors. The network controller appliance(s) 132 can also orchestrate secure connectivity in the data plane 140 between and among the edge network devices 142. For example, in some embodiments, the network controller appliance(s) 132 can distribute crypto key information among the network device(s) 142. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some embodiments, physical or virtual Cisco® SD-WAN vSmart controllers can operate as the network controller appliance(s) 132.

The data plane 140 can be responsible for forwarding packets based on decisions from the control plane 130. The data plane 140 can include the edge network devices 142, which can be physical or virtual network devices. The edge network devices 142 can operate at the edges various network environments of an organization, such as in one or more data centers or colocation centers 150, campus networks 152, branch office networks 154, home office networks 156, and so forth, or in the cloud (e.g., Infrastructure as a Service (IaaS), Platform as a Service (PaaS), SaaS, and other cloud service provider networks). The edge network devices 142 can provide secure data plane connectivity among sites over one or more WAN transports, such as via one or more Internet transport networks 160 (e.g., Digital Subscriber Line (DSL), cable, etc.), MPLS networks 162 (or other private packet-switched network (e.g., Metro Ethernet, Frame Relay, Asynchronous Transfer Mode (ATM), etc.), mobile networks 164 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The edge network devices 142 can be responsible for traffic forwarding, security, encryption, quality of service (QoS), and routing (e.g., BGP, OSPF, etc.), among other tasks. In some embodiments, physical or virtual Cisco® SD-WAN vEdge routers can operate as the edge network devices 142.

Figure 2:
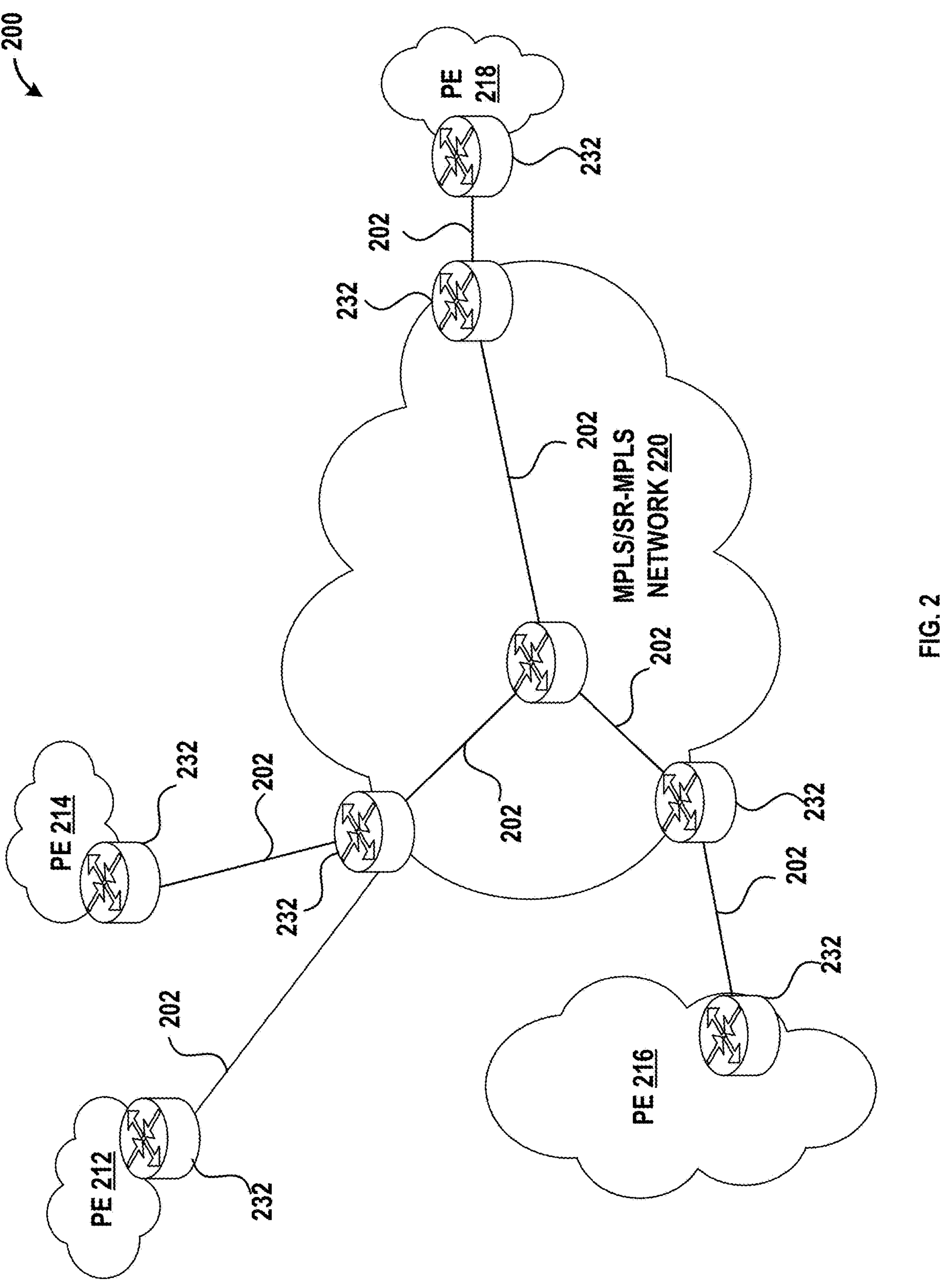
FIG. 2 illustrates an example communication network including one or more autonomous systems (ASes) in accordance with some aspects of the present technology.

FIG. 2 is a schematic block diagram of an example computer network 200 illustratively comprising network devices 214 interconnected by various methods of communication. For instance, the links 202 may be any suitable combination of wired links and shared media (e.g., wireless links, Internet Exchange Points, etc.) where certain network devices 214, such as, e.g., routers, computers, etc., may be in communication with other network devices 214, e.g., based on distance, signal strength, current operational status, location, etc. Those skilled in the art will understand that any number of network devices 214, links, etc. may be used in the computer network, and that the view shown herein is for simplicity.

Data packets (e.g., traffic and/or messages sent between the network devices 214) may be exchanged among the network devices 214 of the computer network 200 using predefined network communication protocols such as certain known wired protocols, as well as wireless protocols or other shared-media protocols where appropriate.

The computer network 200 includes a set of autonomous systems (AS); in the examples outlined herein, the set of ASes can include provider edge devices (PEs) 212, 214, 216 and 218 that can all be PIM domains, and can further include MPLS/SR-MPLS network 220 therebetween. In some embodiments, the MPLS/SR-MPLS network 220 can support an EVPN overlay. The computer network 200 may be positioned in any suitable network environment or communications architecture that operates to manage or otherwise direct information using any appropriate routing protocol or data management standard. For example, computer network 200 may be provided in conjunction with a border gateway protocol (BGP).

As noted above, an autonomous system may be a collection of connected Internet Protocol (IP) routing network devices 232 under the control of one or more network operators that presents a common, clearly defined routing policy to a network (e.g., the Internet). Usually, an autonomous system comprises network devices 232 that are established on the edge of the system, and that serve as the system's ingress and egress points for network traffic. Moreover, the network devices 232 may be considered edge network devices, border routers, or core network devices within the respective autonomous system. These network devices typically, but not always, are routers or any other element of network infrastructure suitable for switching or forwarding data packets according to a routing protocol or switching protocol. For the purposes of the present disclosure, the network devices 232 located within an autonomous system may alternatively be referred to as "forwarding network devices" or "intermediate network devices." Moreover, for illustration purposes, the ASes (e.g., PEs 212, 214, 216, 218, and MPLS/SR-MPLS network 220) are shown with a limited number of network devices 232. In an actual implementation, however, an autonomous system normally includes numerous routers, switches, and other elements.

Each AS (e.g., PEs 212, 214, 216, 218, and MPLS/SR-MPLS network 220) may be associated with an Internet Service provider (ISP). Even though there may be multiple autonomous systems supported by a single ISP, the Internet only sees the routing policy of the ISP. That ISP has an officially registered Autonomous System Number (ASN). As such, a unique ASN is allocated to each autonomous system for use in BGP routing. ASNs are important primarily because they uniquely identify each network on the Internet.

To facilitate the routing of network traffic through the autonomous systems, or more specifically, the network devices 232 within the autonomous systems, the network devices may exchange routing information to various network destinations. As described above, BGP is conventionally used to exchange routing and reachability information among network devices 232 within a single autonomous system or between different autonomous systems. The BGP logic of a router is used by the data collectors to collect BGP autonomous system path information, e.g., the "AS_PATH" attribute, as described further below, from BGP tables of border routers of an autonomous system, to construct paths to prefixes.

To exchange BGP routing information, two BGP hosts (network devices 232), or peers, first establish a transport protocol connection with one another. Initially, the BGP peers exchange messages to open a BGP session, and, after the BGP session is open, the BGP peers exchange their entire routing information. Thereafter, in certain embodiments, only updates or changes to the routing information, e.g., the "BGP UPDATE" attribute, are exchanged, or advertised, between the BGP peers. The exchanged routing information is maintained by the BGP peers during the existence of the BGP session.

The BGP routing information may include the complete route to each network destination, e.g., "destination network device," that is reachable from a BGP host. A route, or path, comprises an address destination, which is usually represented by an address prefix (also referred to as prefix), and information that describe the path to the address destination. The address prefix may be expressed as a combination of a network address and a mask that indicates how many bits of the address are used to identify the network portion of the address. In Internet Protocol version 4 (IPv4) addressing, for example, the address prefix can be expressed as "9.2.0.2/16". The "/16" indicates that the first 16 bits are used to identify the unique network leaving the remaining bits in the address to identify the specific hosts within this network.

A path joining a plurality of autonomous systems, e.g., links 202, may be referred to as an "AS_PATH." The AS_PATH attribute indicates the list of autonomous systems that must be traversed to reach the address destination. For example, as illustrated in FIG. 2, the PE 218 may store an AS_PATH attribute of "212 220 218" where the address destination is the PE 218 (or a particular IP address within PE 218). Here, the AS_PATH attribute indicates that the path to the address destination PE 218 from PE 212 passes through PE 214, and MPLS/SR-MPLS network 220 and to PE 218, in that order.

Although it may be preferable that all network devices 232 in the respective ASes (e.g., PEs 212, 214, 216, 218, and MPLS/SR-MPLS network 220) be configured according to BGP, in a real-world implementation, it may be unlikely that each network device communicates using BGP. Thus, the disclosed embodiments are applicable to scenarios where all network devices 232 in the computer network 200 are configured according to BGP, as well as scenarios where only a subset of the network devices 232 are configured as such.

Moreover, a security extension to the BGP has been developed, referred to as BGPSEC, which provides improved security for BGP routing. BGP does not include mechanisms that allow an autonomous system to verify the legitimacy and authenticity of BGP route advertisements. The Resource Public Key Infrastructure (RPKI) provides a first step towards addressing the validation of BGP routing data. BGPSEC extends the RPKI by adding an additional type of certificate, referred to as a BGPSEC router certificate, that binds an autonomous system number to a public signature verification key, the corresponding private key of which is held by one or more BGP speakers within this autonomous system. Private keys corresponding to public keys in such certificates can then be used within BGPSEC to enable BGP speakers to sign on behalf of their autonomous system. The certificates thus allow a relying party to verify that a BGPSEC signature was produced by a BGP speaker belonging to a given autonomous system. Thus, a goal of BGPSEC is to use signatures to protect the autonomous system Path attribute of BGP update messages so that a BGP speaker can assess the validity of the autonomous system Path in update messages that it receives. It should be understood, however, that the embodiments for implementing autonomous system Path security disclosed herein are not limited to BGPSEC; certain embodiments may, additionally or alternatively, be applicable to other suitable protocols, including, for example, SoBGP, S-BGP, and PGPBGP, to name just a few.

EVPN (Ethernet Virtual Private Network) is a technology for building virtual private networks (VPNs) using Ethernet Virtual Connections (EVCs) instead of traditional Layer 3 IP VPNs. It allows service providers to offer a wide range of Layer 2 and Layer 3 VPN services to customers over a common infrastructure, using Multiprotocol Label Switching (MPLS) or Virtual Extensible LAN (VXLAN) as the underlying transport technology. Corresponding with various systems and methods discussed herein, the MPLS/SR-MPLS networks (e.g., MPLS/SR-MPLS network 162 of FIG. 1, MPLS/SR-MPLS network 220 of FIG. 2) can operate under EVPN; likewise, the provider edge devices (e.g., PEs 212, 214, 216, 218 of FIG. 2) can communicate with associated sources over individual EVPN instances as discussed herein.

EVPN allows for the creation of a single Layer 2 or Layer 3 VPN domain that can span multiple sites, such as data centers or remote offices. This allows for the creation of a virtual LAN (VLAN) or virtual private wire service (VPWS) that can connect multiple sites together as if they were on the same physical LAN.

EVPN also supports several advanced features such as Virtual Private LAN Service (VPLS), which allows for the creation of a full mesh of Layer 2 VPN connections between multiple sites, and Any-to-Any communication within the VPN. Additionally, EVPN also supports BGP-based auto-discovery and signaling, which simplifies the configuration and management of VPNs.

EVPN is a powerful technology that offers many benefits over traditional IP VPNs. It allows for more efficient use of network resources, better scalability, and more advanced features such as VPLS and Any-to-Any communication. It is an ideal solution for service providers looking to offer advanced VPN services to their customers, as well as for enterprise customers looking to connect multiple sites together over a virtual private network.

For clarity of explanation, in some instances the present technology may be presented as including individual functional blocks including functional blocks comprising devices, device components, steps or routines in a method embodied in software, or combinations of hardware and software.

Volume Reduction in Multicast Networks

FIGS. 3A-3F show a multicast network 300, including a plurality of routers (e.g., a first router "R1" 320A, a second router "R2" 320B, and a third router "R3" 320C) in communication with one another over an MPLS (or SR-MPLS) network 302 for communication of information between one another. As shown, each router 320A-320C can be connected to the MPLS network 302 by one or more provider edge devices (also called "provider edge routers", hereinafter, "PEs" 330A-330E). In the simplified example shown, the MPLS network 302 communicates with four PEs (e.g., a first PE "PE1" 330A, a second PE "PE2" 330B, a third PE "PE3" 330C, a fourth PE "PE4" 330D, and a fifth PE "PE5" 330E); where PE1 330A communicates with R1 320A, PE2 330B and PE5 330E communicate with R3 320C, PE3 330C communicates with R2 320B, and PE4 330D is not currently connected with a router. In the examples, R1 320A is connected to a first customer, who can be a "subscriber" requesting multicast content, and R4 320C is connected to a second customer, who can be a "source" that sends the requested multicast content. The following discussion is provided from the perspective of the PEs, namely PE1 330A and PE2 330B, that perform the functionalities discussed herein to facilitate multicast connection between customers. The routers 320A-320C and/or associated PEs 330A-330E can be considered multicast group members of a multicast group. In multicast networks, subscribers need to send maintenance messages for joining and remaining within a multicast flow; these maintenance messages can include "join" messages that notify PEs associated with a source that the subscriber is joining the multicast group, and can also include "hello" messages that are sent at repeated intervals (usually every few seconds or so) to remain within the multicast group (e.g., informing the source that the subscriber is still "alive" and available to receive multicast content).

The present disclosure, especially with respect to FIGS. 3B-7B, provides a description of various functionalities that can be implemented at PEs 330A-330E. However, in some embodiments, the MPLS network 302 can include a network controller that intercepts maintenance messages and implements the various functionalities discussed herein.

Multicast Maintenance Message Handling: Previous Methods

Figure 3A:
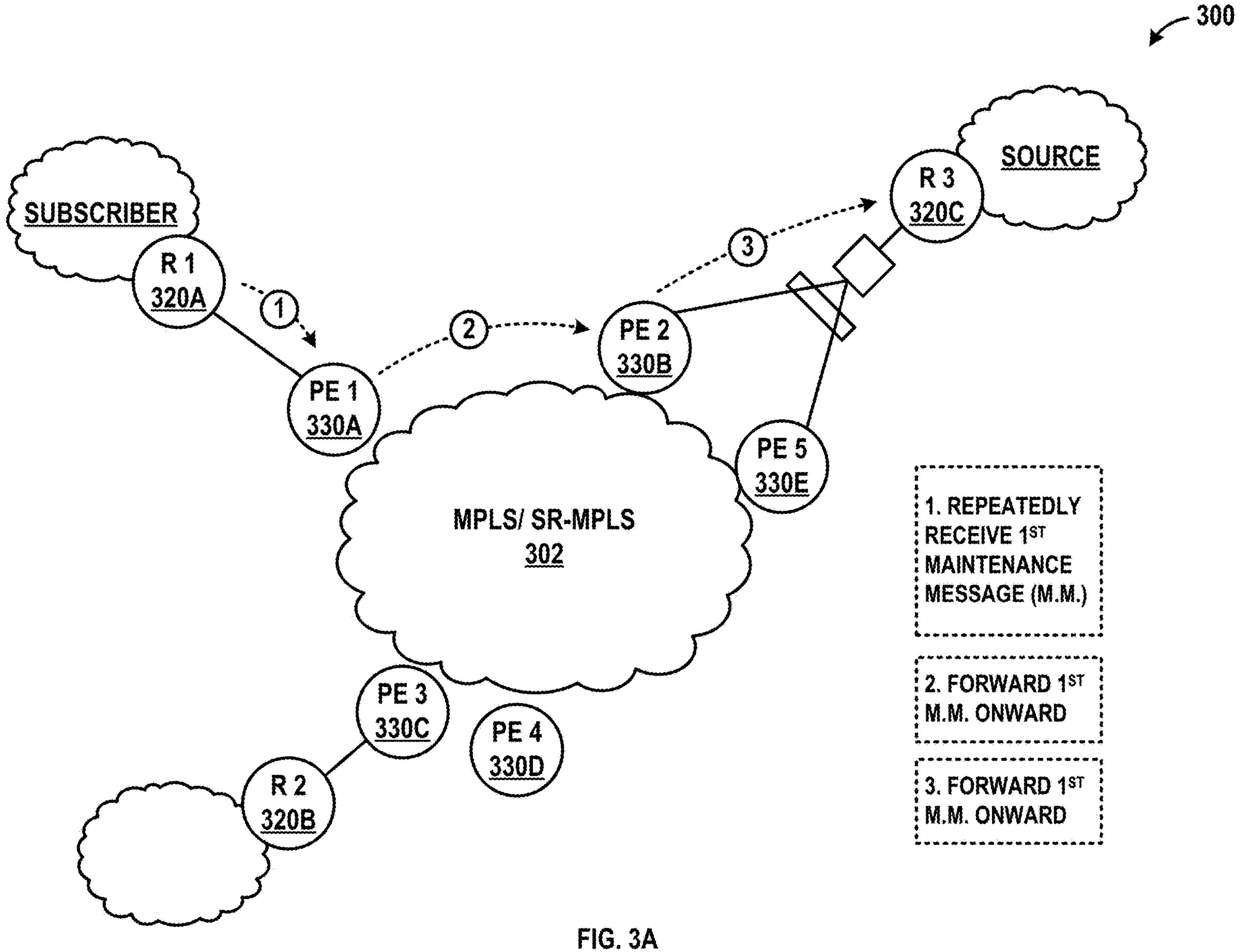
FIG. 3A illustrates a multicast network including a plurality of provider edge devices that communicate over EVPN through an MPLS/SR-MPLS network.

As shown in FIG. 3A, when a customer behind R1 320A is communicating with a customer behind R3 320C (e.g., such as when the customer behind R1 320A is a subscriber to multicast content being provided by the customer behind R3 320C), R1 320A sends repeated maintenance messages to R3 320C at regular intervals essentially informing R3 320C that R1 320A is still "alive". These repeated maintenance messages are received by PE1 330A (at a first step (1)), which forwards them onward to PE2 330B over the MPLS network 302 (at a second step (2)), which in turn forwards them onward to R3 320C (at a third step (3)); this is repeated indefinitely at regular intervals. One problem is that this arrangement introduces excessive traffic volume into the MPLS network 302 that can reduce available bandwidth.

Multicast Maintenance Message Handling: Present Solution

Figure 3B:
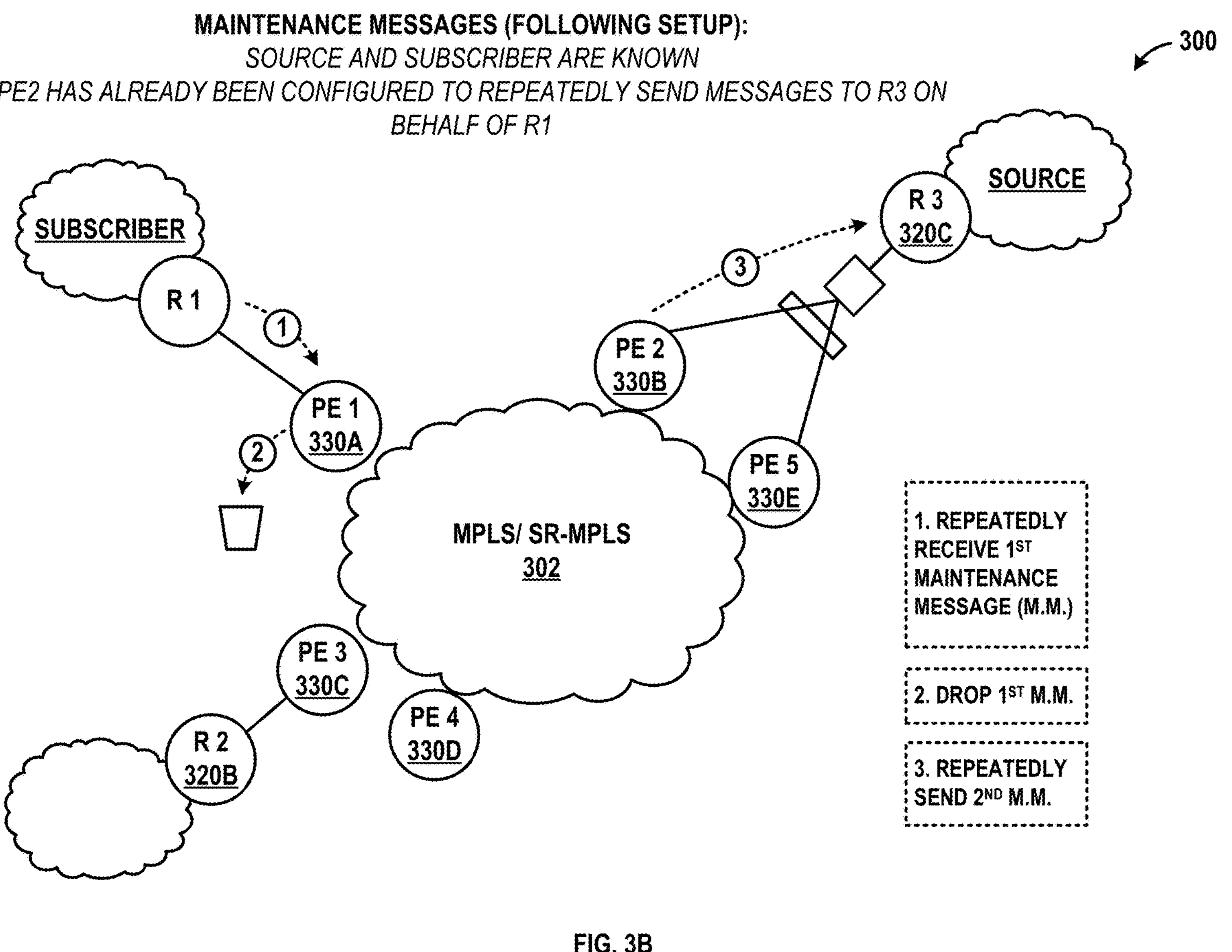
FIG. 3B illustrates a multicast network including a plurality of provider edge devices that communicate over EVPN through an MPLS/SR-MPLS network for reducing maintenance message traffic through the multicast network in accordance with some aspects of the present technology.

In contrast, with reference to FIG. 3B, the present disclosure is directed to reducing the volume of traffic being sent over the MPLS network 302 to maintain multicast flow by setting up PEs to send these maintenance messages to connected nodes on behalf of the receiving node.

FIG. 3B shows the multicast network 300 following setup or establishment of a multicast connection from the subscriber behind R1 320A (e.g., a $p^{th}$ router) to the source behind R3 320C (e.g., an $s^{th}$ router). In this example, the locations of the source and the subscriber are already known, and PE2 330B (e.g., an $r^{th}$ PE in communication with the $s^{th}$ router) has already been configured to repeatedly send maintenance messages to R3 320C on behalf of R1 320A (an operation which will be described herein). At a first step (1), PE1 330A (e.g., a $q^{th}$ PE in communication with the $p^{th}$ router) repeatedly receives a first maintenance message from R1 320A. Instead of repeatedly forwarding the first maintenance message from R1 320A onward to R3 320C (behind PE2 330B), at a second step (2), PE1 330A drops the first maintenance message from R1 320A without requiring further communication with PE2 330B. Because PE2 330B has already been set up to repeatedly send maintenance messages to R3 320C on behalf of R1 320A, at a third step (3), PE2 330B generates and sends maintenance messages to R3 320C at constant intervals on behalf of R1 320A. This process can be iteratively repeated until an update is required (e.g., if R1 320A, PE1 330A, PE2 330B or R3 320C become unresponsive or otherwise stop requesting or sending content). This arrangement reduces the amount of traffic from repeated maintenance messages that would otherwise be transmitted over the MPLS network 302.

Routers 320A-320C can be PIM routers, and PEs 330A-330E can be EVPN enabled routers. When routers 320A-320C send "hello" maintenance messages, respective PEs 330A-330E receive these maintenance messages (e.g., as PIM packets, however other protocols are also possible). PEs 330A-330E "snoop" the maintenance messages and terminate messaging (e.g., by dropping the messages). PEs 330A-330E convert the maintenance messages to BGP-based routing (e.g., to be included within Network layer reachability information (NLRI) messaging between BGP-based peers such as PEs 330A-330E) to generate new maintenance messages, and send the new maintenance messages over EVPN address family. Information sent by PEs 330A-330E can include: PIM router information (e.g., information about an associated router 320A, 320B, or 320C who is originating the maintenance message), PIM hello attributes (where the maintenance message is a "hello" message), and ethernet segment (ES) information (0 for single home). When BGP-based "hello" maintenance messages (e.g., as NLRI messages) are received by a PE connected to the source, the receiving PE would mark which maintenance messages are part of multi-home peers based on the ES information. The receiving PE can be configured to generate and send PIM-based maintenance messages on behalf of the subscriber; the subscriber can be marked by the receiving PE as an EVPN learnt neighbor (e.g., recording locations and associated segment routes for reference by the receiving PE) without requiring designated router (DR) election.

At the end of this step, a PIM entry at a router (e.g., R1 320A) associated with the subscriber can look like:

Neighbor Priority Interface
R1 1.1.1.1 100 local interface
R2 2.2.2.2 110 R1-PE1 interface
R3 3.3.3.3 200 R1-PE2 interface When PIM join messages from the subscriber (e.g., associated with R1 320A) reach the corresponding PE (e.g., PE1 330A), and a subnet associated with the source is the same subnet as the bridge domain, there is no need for the PE to send PIM join messages to all connected peers. The PE associated with the subscriber can search within an EVPN host table (e.g., a routing table) to determine if there is a known host for a given source. If the source address is known and present in the table, the PE generates join messages that are targeted to only PEs where the host is local; the join messages sent between PEs can be BGP-based (e.g., through NLRI messaging) rather than PIM-based. Conversely, if the source host is not learned yet, it may be a silent host. In this case, join messages can be sent to all connected PEs. Once the join message is received, and the source is still not known, an Address Resolution Protocol (ARP) query could be generated to find the host. Once the location of the source is learned, EVPN procedures would take care of announcing the location to all PEs, and the originator of the join message (e.g., the subscriber) would change the route target to be processed only by the PE which has the actual source, and will send an updated join message to only the targeted PE. This arrangement reduces the volume of unnecessary messages that can flood the multicast network and reduces unnecessary workloads on connected PEs.

In the case of join messages being sent to a different subnet, once the join messages reach a PE, the PE can look at unicast reachability to identify the appropriate prefix and generate a new join message targeted only to the appropriate PE.

In a further aspect, if a connection between a router (e.g., R1 320A) and a PE (e.g., PE1 330A) fails, the associated PE will notice the connection failure and adjust the network accordingly. The routers and/or PEs can also maintain a timer to adapt when another type of failure such as software failure is present. If no message is received within a predetermined amount of time, this is perceived as a failure and the components of the network are prompted to adjust accordingly.

Further, while the above discussion is provided in terms of PIM-based messaging between routers (e.g., R1 320A) and their associated PEs (e.g., PE1 330A), other embodiments are also possible where messaging between routers and associated PEs is based in another protocol.

Establishing Multicast Connection: Source Location is Known

Figure 3C:
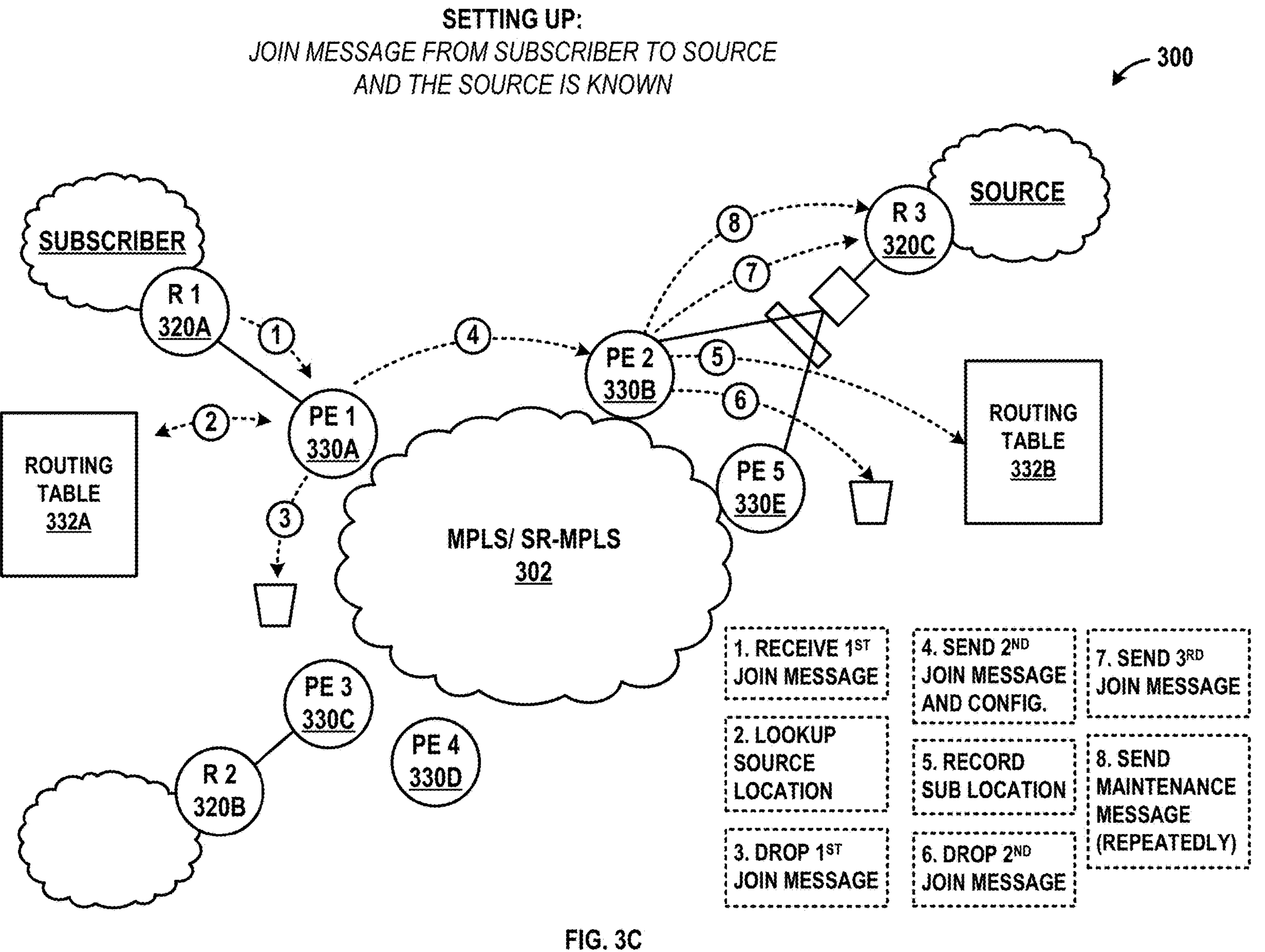
FIG. 3C illustrates the multicast network of FIG. 3B during setup or establishment of a multicast connection from a subscriber when a location of a source is known in accordance with some aspects of the present technology.

FIG. 3C shows the multicast network 300 during setup or establishment of a multicast connection from the subscriber behind R1 320A to the source behind R3 320, where the location of the source is known by PE1 330A. At a first step (1), PE1 330A receives a first join message from R1 320A requesting to join a multicast flow associated with the source; the first join message between a router (e.g., R1 320A) and an associated PE (e.g., PE1 330A) can be PIM-based (or based in another suitable protocol). At a second step (2), PE1 330A communicates with a first routing table 332A to retrieve or otherwise look up the location of the source; in this example, the first routing table 332A indicates that the source is behind PE2 330B which intercepts traffic meant for R3 320. At a third step (3), PE1 330A drops the first join message. At a fourth step (4), PE1 330A generates and sends a second join message over MPLS network 302 to PE2 330B that includes instructions to configure PE2 330B to send maintenance messages to R3 320C on behalf of R1 320A; the second join message between respective PEs (e.g., PE1 330A and PE2 330B) can be NLRI-based. Further, the instructions to configure the PE to send maintenance messages on behalf of the originating router can be present in an extension to NLRI messaging protocol. Upon receipt of the second join message, and following configuration of PE2 330B to send maintenance messages to R3 320C on behalf of R1 320A, at a fifth step (5), PE2 330B records the location of PE1 330A and/or R1 320A at a second routing table 332B based on the information received within the second join message. At a sixth step (6), PE2 330B drops the second join message. At a seventh step (7), PE2 330B generates and sends a third join message to R3 320C on behalf of R1 320A to inform the source that the subscriber behind R1 320A is joining the multicast flow facilitated by the source; the third join message between the PE (e.g., PE2 330B) and the source router (e.g., R3 320C) can be PIM-based (or based in another suitable protocol). At an eighth step (8), PE2 330B generates and sends maintenance messages to R3 320C at constant intervals on behalf of R1 320A. Following step (8), PE1 330A can continue to drop any "hello" maintenance messages sent by R1 320A destined for R3 320C instead of sending them over the MPLS network 302. PE2 330B can generate and send "hello" maintenance messages to R3 320C at constant intervals on behalf of R1 320A as discussed above with reference to FIG. 3B; the "hello" maintenance messages generated by PE2 330B and send to R3 330C on behalf of R1 320A can be PIM-based (or based in another suitable protocol).

Establishing Multicast Connection: Source Location is Unknown

Figure 3D:
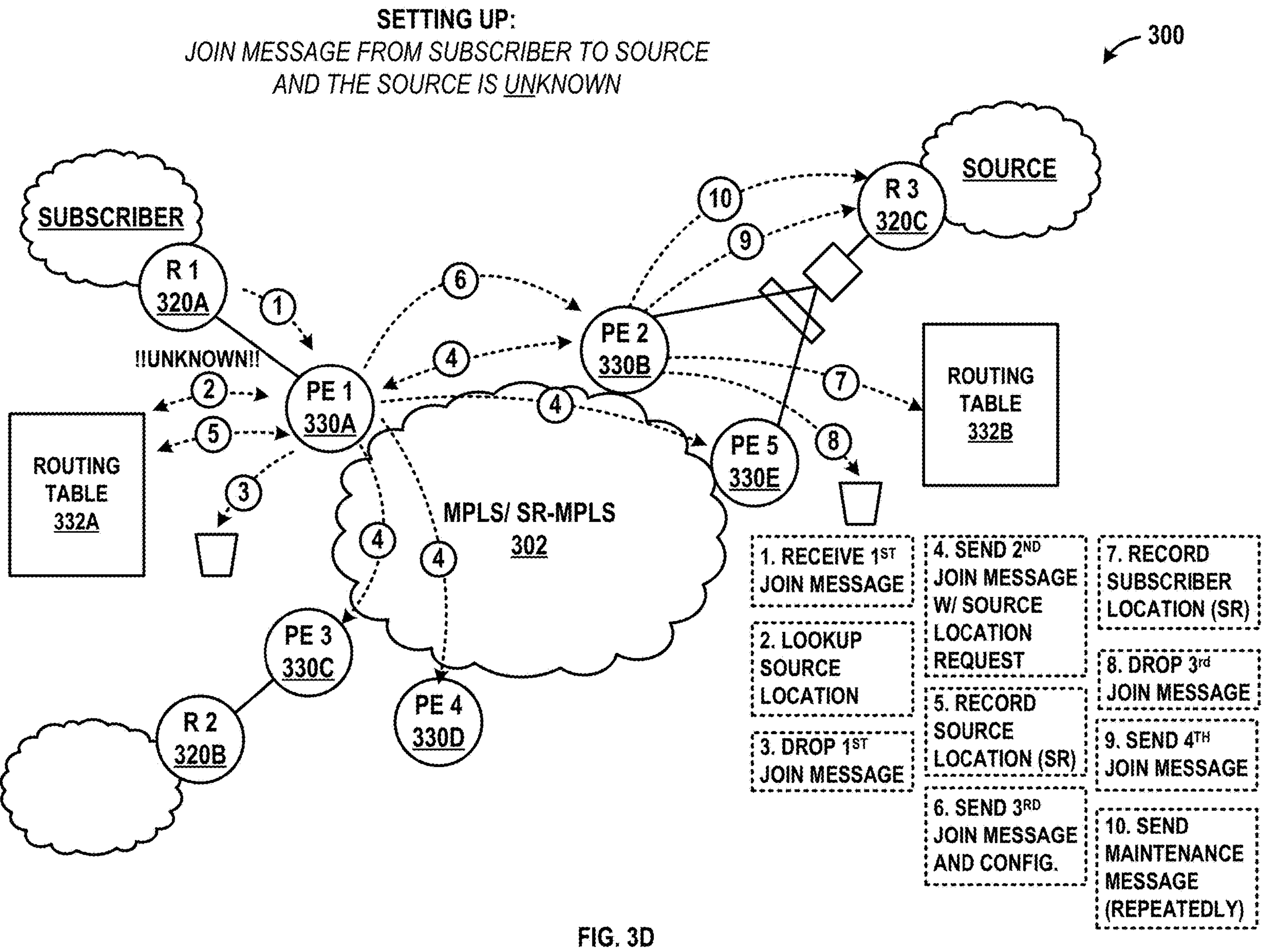
FIG. 3D illustrates the multicast network of FIG. 3B during setup or establishment of a multicast connection from a subscriber when a location of a source is unknown in accordance with some aspects of the present technology.

FIG. 3D shows the multicast network 300 during setup or establishment of a multicast connection from the subscriber behind R1 320A to the source behind R3 320, where the location of the source is not known by PE1 330A. At a first step (1), PE1 330A receives a first join message from R1 320A requesting to join a multicast flow associated with the source; the first join message can be PIM-based (or based in another suitable protocol). At a second step (2), PE1 330A communicates with a first routing table 332A to retrieve or otherwise look up the location of the source; in this example, the source is behind PE2 330B which intercepts traffic meant for R3 320, however in the example of FIG. 3D, this information may not be available, and PE1 330A recognizes that the location of the requested source is unknown. At a third step (3), PE1 330A drops the first join message. At a fourth step (4), PE1 330A generates and sends a second join message that includes a request for a source location over MPLS network 302 to all connected PEs, including PE2 330B, PE3 330C, PE4 330D and PE5 330E; this second join message can be NLRI-based. Following receipt of the second join message with source location at PE2 330B, PE2 330B may respond to PE1 330A with a return message informing PE1 330A of the location of the source. In some examples, PE1 330A can learn the location of the source using BGP. At a fifth step (5), with the source location known, PE1 330A records the location of the source (and corresponding segment route) within the routing table 332A. At a sixth step (6), PE1 330A generates and sends a third join message over MPLS network 302 to PE2 330B that includes instructions to configure PE2 330B to send maintenance messages to R3 320C on behalf of R1 320A; this third join message can be NLRI-based. Upon receipt of the second join message, and following configuration of PE2 330B to send maintenance messages to R3 320C on behalf of R1 320A, at a seventh step (7), PE2 330B records the location of the subscriber in a second routing table 332B. At an eighth step (8), PE2 330B drops the third join message. At a ninth step (9), PE2 330B generates and sends a fourth join message to R3 320C on behalf of R1 320A to inform the source that the subscriber behind R1 320A is joining the multicast flow facilitated by the source; this fourth join message can be PIM-based (or based in another suitable protocol). At a tenth step (10), PE2 330B generates and sends "hello" maintenance messages to R3 320C at constant intervals on behalf of R1 320A as shown and discussed above with reference to FIG. 3B. PE1 330A can continue to drop any "hello" maintenance messages sent by R1 320A destined for R3 320C instead of sending them over the MPLS network 302, because PE2 330B generates and sends maintenance messages to R3 320C at constant intervals on behalf of R1 320A; the "hello" maintenance messages generated by PE2 330B on behalf of R1 320A can be PIM-based (or based in another suitable protocol).

Establishing Multicast Connection: Subscriber Location is Unknown

Figure 3E:
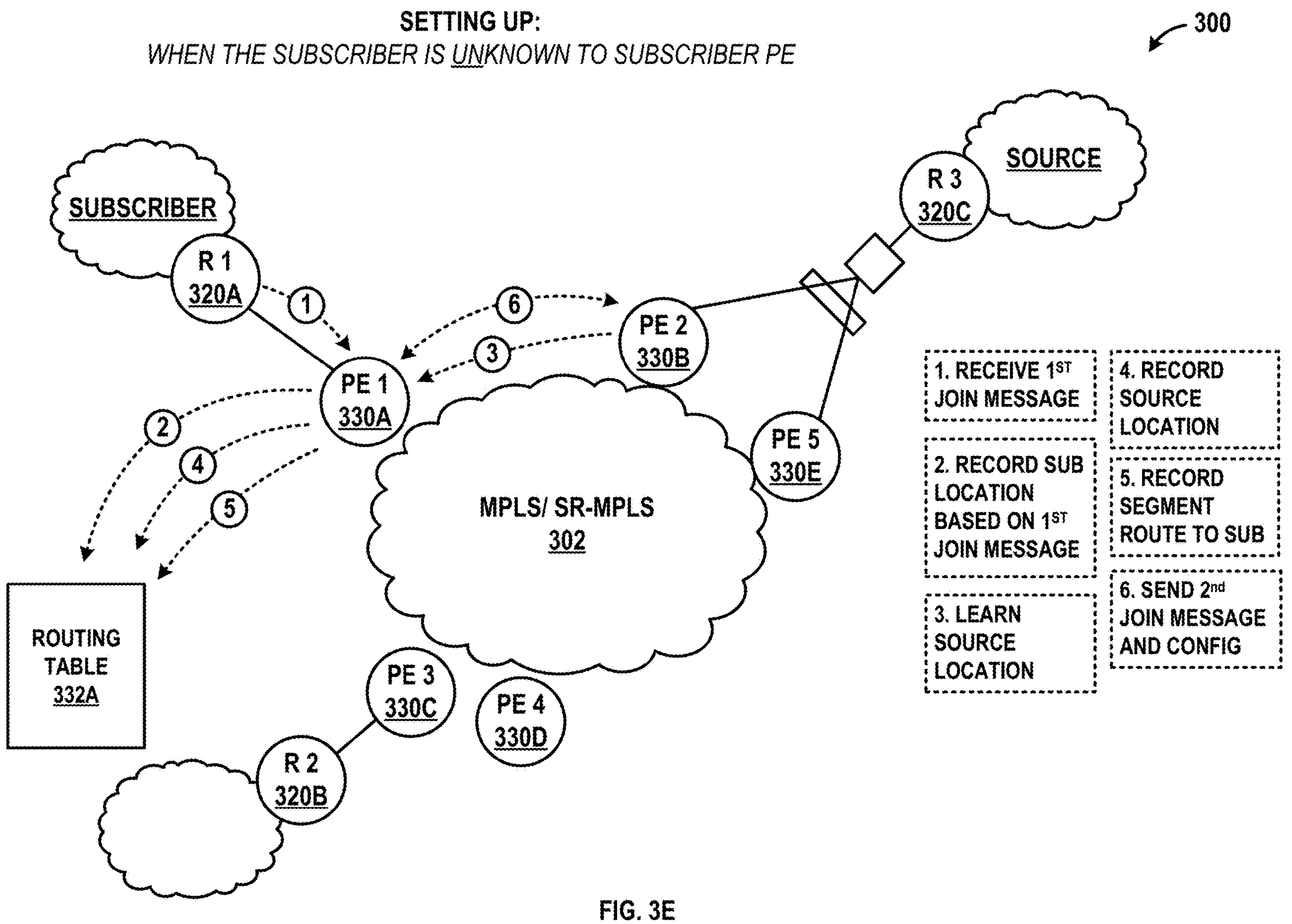
FIG. 3E illustrates the multicast network of FIG. 3B during setup or establishment of a multicast connection from a subscriber when a location of the subscriber is unknown in accordance with some aspects of the present technology.

FIG. 3E shows setup or establishment of a multicast connection from a subscriber to a source, where the location of the subscriber is not known. The subscriber PE can use the first join message received from the subscriber router to learn and record the location of the subscriber.

FIG. 3E shows the multicast network 300 during setup or establishment of a multicast connection from the subscriber behind R1 320A to the source behind R3 320, where the location of the subscriber is not known by PE1 330A At a first step (1), PE1 330A receives a first join message from R1 320A (e.g., when establishing the multicast connection); this first join message can be PIM-based (or based in another suitable protocol). At a second step (2), PE1 330A learns and records a location of the subscriber in the first routing table 332A based on the first join message from R1 320A. At a third step (3), PE1 330A learns a location of the source using BGP. At a fourth step (4), PE1 330A records the location of the source in the first routing table 332A. At a fifth step (5), PE1 330A records a segment route for forwarding content to the subscriber in the first routing table 332A. At a sixth step (6), PE1 330A generates and sends a second join message over MPLS network 302 to PE2 330B that includes instructions to configure PE2 330B to send maintenance messages to R3 320C on behalf of R1 320A; this second join message can be NLRI-based. Similarly, following this process, PE1 330A and PE2 330B can continue to handle maintenance messages as discussed above with reference to FIG. 3B, where PE1 330A receives and drops maintenance messages from R1 320A and PE2 330B generates and sends maintenance messages to R3 320C on behalf of R1 320A; the "hello" maintenance messages generated by PE2 330B on behalf of R1 320A can be PIM-based (or based in another suitable protocol).

Handling Multicast Content

Figure 3F:
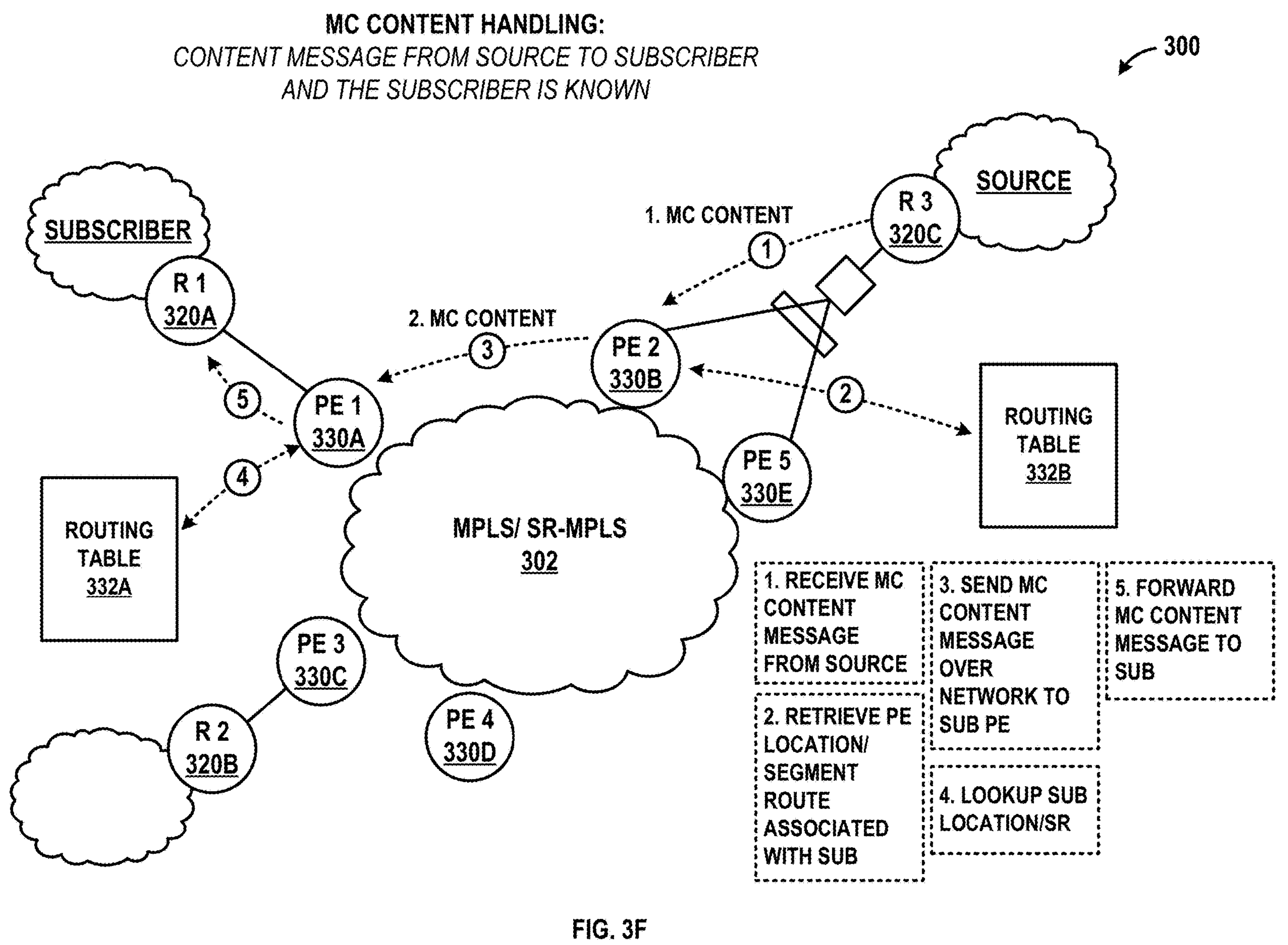
FIG. 3F illustrates the multicast network of FIG. 3B handling multicast content being sent from a source to a subscriber in accordance with some aspects of the present technology.

FIG. 3F shows handling of multicast content being sent over a multicast connection from a source to a subscriber, where the location of the subscriber is known.

FIG. 3F shows the multicast network 300 handling multicast content being sent from the source behind R3 320C to the subscriber behind R1 320A, where the location of the subscriber is known to PE2 330B and where PE2 330B has already been configured to repeatedly send maintenance messages to R3 320C on behalf of R1 320A. At a first step (1), PE2 330B receives a multicast content message from R3 320C. At a second step (2), PE2 330B communicates with the second routing table 332B to retrieve or otherwise look up the location and/or segment route of the subscriber; in this example, the second routing table 332B indicates that the subscriber is behind PE1 330A which intercepts traffic meant for R1 320A. At a third step (3), PE2 330B sends the multicast content message over the MPLS network 302 to PE1 330A. At a fourth step (4), PE1 330A can retrieve or otherwise look up the location and/or segment route of the subscriber for forwarding (e.g., to ensure the message is sent to the correct subscriber in cases where a PE may communicate with more than one router). At a fifth step (5), PE1 330A can forward the multicast content message onward to R1 320A. During this process, PE1 330A and PE2 330B can continue to handle maintenance messages as discussed above with reference to FIG. 3B, where PE1 330A receives and drops maintenance messages from R1 320A and PE2 330B generates and sends maintenance messages to R3 320C on behalf of R1 320A; the "hello" maintenance messages generated by PE2 330B on behalf of R1 320A can be PIM-based (or based in another suitable protocol).

Multicast Controller

In some embodiments, the MPLS network (e.g., MPLS network 302 shown in FIG. 3B) can include a network controller that can absorb or otherwise apply one or more of the functionalities discussed above with respect to FIGS. 3B-4D, including configuring the PEs as PIM proxies. For example, the network controller can inform each PE whether a source or subscriber is within the autonomous system that the associated PE supports, and can provide each respective PE with information for inclusion in their associated routing tables, including network segment routing paths (segment routes). Further, the network controller can intercept maintenance messages (including join messages and/or "hello" messages, and can configure the PEs to generate and send the maintenance messages.

In some examples, the network controller can configure the PIM proxies (e.g., the PEs) to send generate and send maintenance messages. In other examples, the network controller can configure the PEs to forward all maintenance messages to the network controller over a control plane. The network controller could decide (e.g., based on client or user-defined network policies) how to handle these maintenance messages by telling the PEs when to add or remove a subscriber from a multicast group, as opposed to forwarding every maintenance message to the PEs. This arrangement can reduce traffic through the MPLS network.

Methods

FIGS. 4A-4D are a series of process flow diagrams showing a method 400 for establishing and maintaining a multicast connection.

Figure 4A:
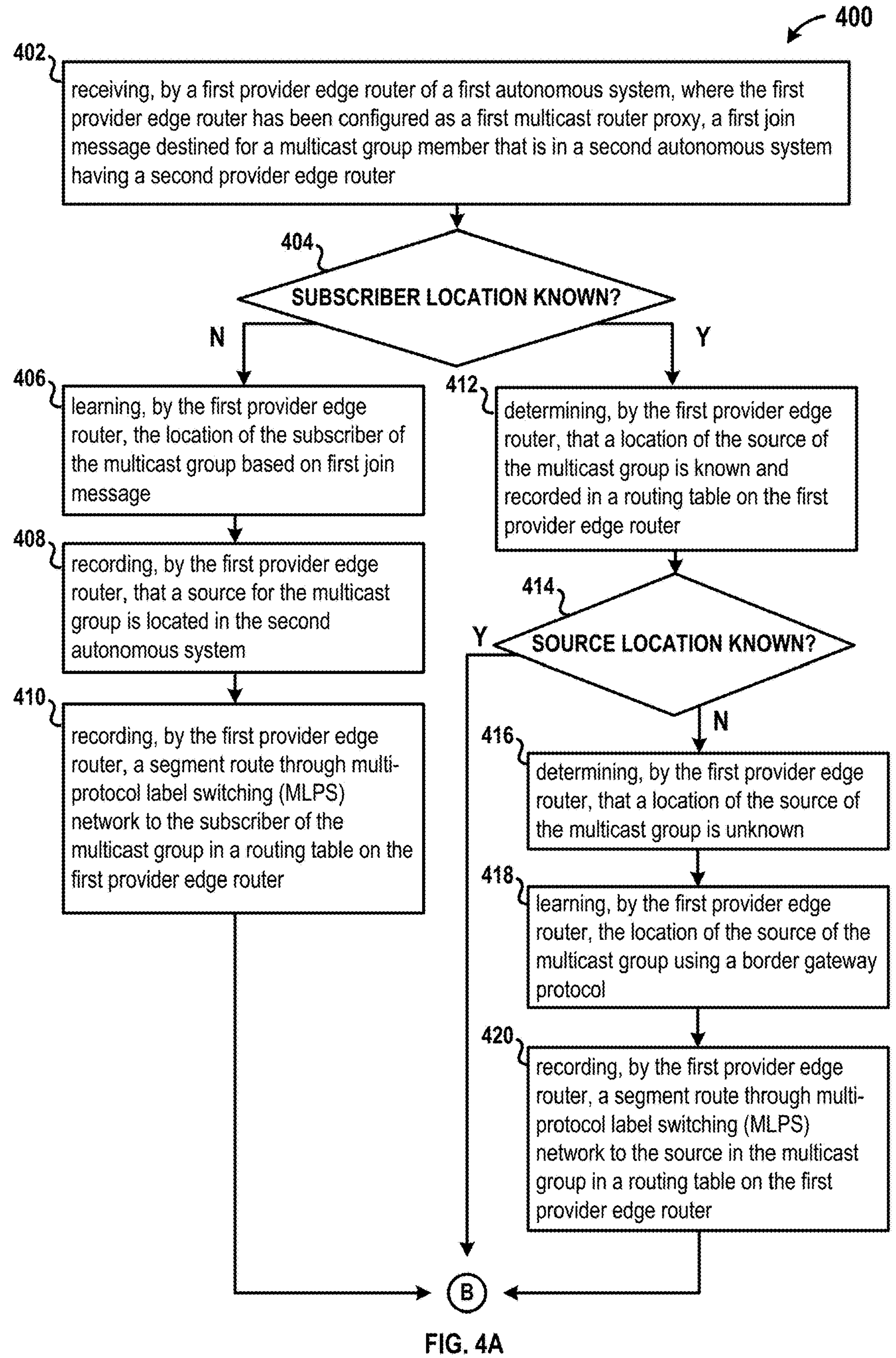
FIGS. 4A, 4B, 4C, and 4D collectively illustrate a method for managing multicast flows for reducing maintenance message traffic through a multicast network in accordance with some aspects of the present technology.

With reference to FIG. 4A, step 402 of method 400 includes receiving, by a first provider edge router of a first autonomous system, where the first provider edge router has been configured as a first multicast router proxy, a first join message destined for a multicast group member that is in a second autonomous system having a second provider edge router. Step 404 shows a branching point in method 400. If the subscriber location is unknown to the first provider edge router, the method 400 continues at step 406, which includes learning, by the first provider edge router, the location of the subscriber of the multicast group based on the first join message. Step 406 is followed by step 408, which includes recording, by the first provider edge router, that a source for the multicast group is located in the second autonomous system. Step 408 is followed by step 410, which includes recording, by the first provider edge router, a segment route through multi-protocol label switching (MLPS) network to the subscriber of the multicast group in a routing table on the first provider edge router. Step 410 concludes at circle B.

If, at step 404, the subscriber location is known to the first provider edge router, then step 412 includes determining, by the first provider edge router, that a location of the source of the multicast group is known and recorded in a routing table on the first provider edge router.

Following step 412, step 414 shows another branching point in method 400. If the source location is known, then step 412 concludes at circle B.

If the source location is unknown, step 416 includes determining, by the first provider edge router, that a location of the source of the multicast group is unknown. Step 418 includes learning, by the first provider edge router, the location of the source of the multicast group using a border gateway protocol. Step 420 includes recording, by the first provider edge router, a segment route through multi-protocol label switching (MLPS) network to the source in the multicast group in a routing table on the first provider edge router. Step 420 concludes at circle B.

Figure 4B:
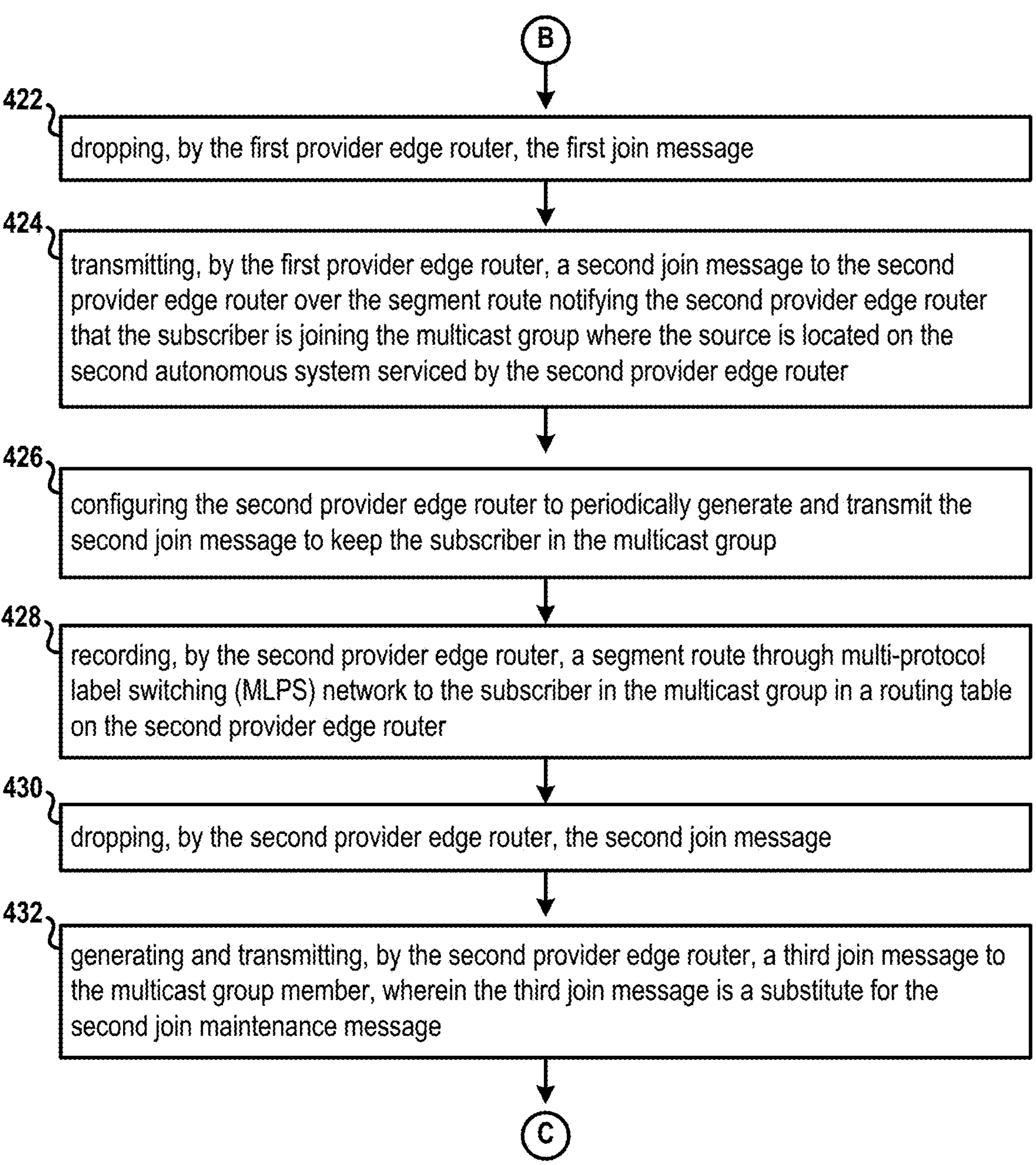

With reference to FIG. 4B, and continuing at circle B, step 422 includes dropping, by the first provider edge router, the first join message. Step 424 includes transmitting, by the first provider edge router, a second join message to the second provider edge router over the segment route notifying the second provider edge router that the subscriber is joining the multicast group where the source is located on the second autonomous system serviced by the second provider edge router. Step 426 includes configuring the second provider edge router to periodically generate and transmit the second join message to keep the subscriber in the multicast group. Step 428 includes recording, by the second provider edge router, a segment route through multi-protocol label switching (MLPS) network to the subscriber in the multicast group in a routing table on the second provider edge router. Step 430 includes dropping, by the second provider edge router, the second join message. Step 432 includes generating and transmitting, by the second provider edge router, a third join message to the multicast group member, wherein the third join message is a substitute for the second join maintenance message. FIG. 4B concludes at circle C.

Figure 4C:
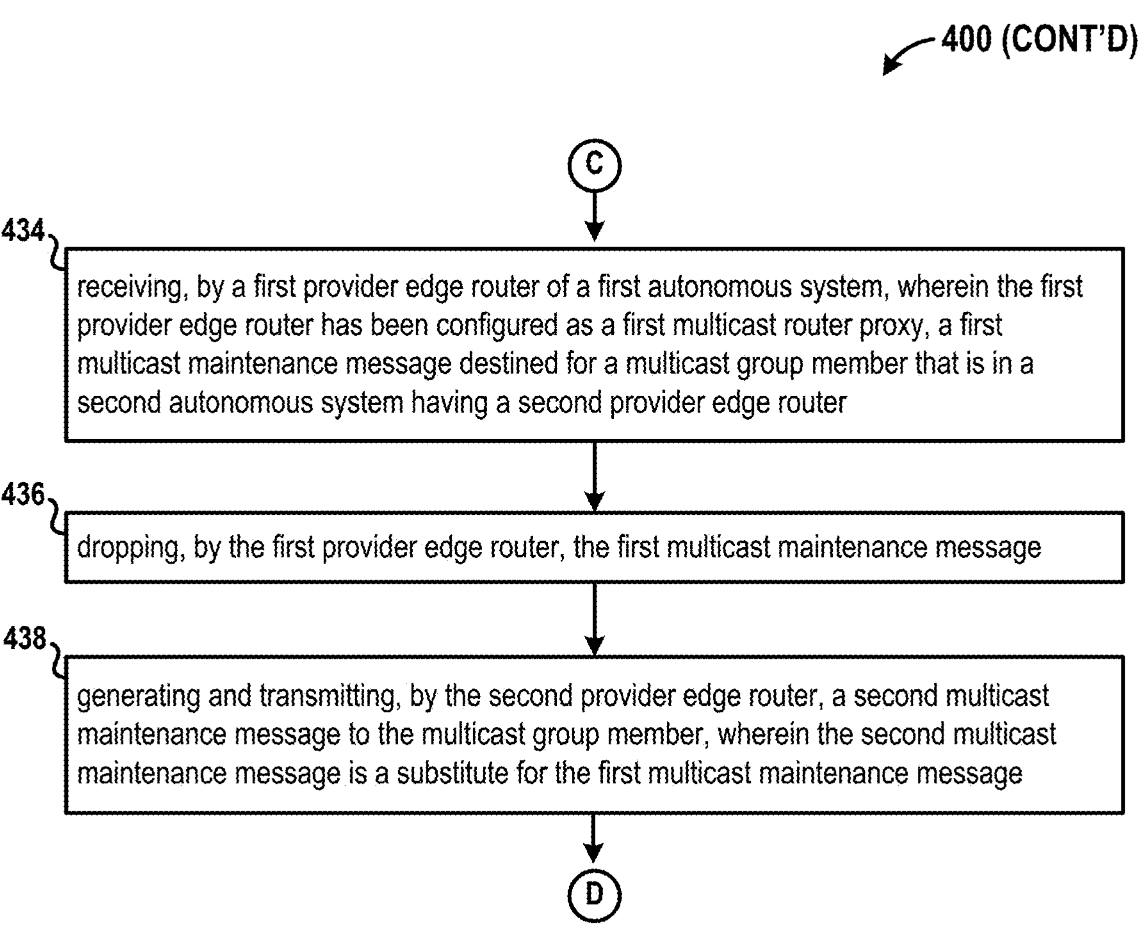

With reference to FIG. 4C, and continuing at circle C, step 434 includes receiving, by a first provider edge router of a first autonomous system, wherein the first provider edge router has been configured as a first multicast router proxy, a first multicast maintenance message destined for a multicast group member that is in a second autonomous system having a second provider edge router. Step 436 includes dropping, by the first provider edge router, the first multicast maintenance message. Step 438 includes generating and transmitting, by the second provider edge router, a second multicast maintenance message to the multicast group member, wherein the second multicast maintenance message is a substitute for the first multicast maintenance message. Steps 434-438 can be iteratively repeated. FIG. 4C concludes at circle D.

Figure 4D:
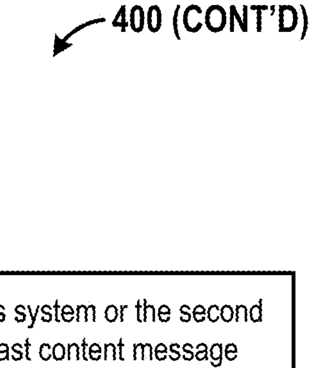
Figure 4D:

With reference to FIG. 4D, and continuing at circle D, step 440 includes receiving, by the first provider edge router of the first autonomous system or the second provider edge router of the second autonomous system, a multicast content message destined for the subscriber. Step 442 includes determining, by the first provider edge router or the second provider edge router, the subscriber to the multicast group to receive the multicast content message. Step 444 includes forwarding, by the first provider edge router or the second provider edge router, the multicast content message to the subscriber to the multicast group using a respective segment route associated with the subscriber to the multicast group. Steps 440-444 can be iteratively repeated as multicast content messages are sent to the subscriber. FIG. 4D concludes at circle C, indicating that the steps 434-438 of FIG. 4C can be iteratively repeated to maintain the multicast connection while steps 440-444 are being performed.

Network Device

Figure 5:
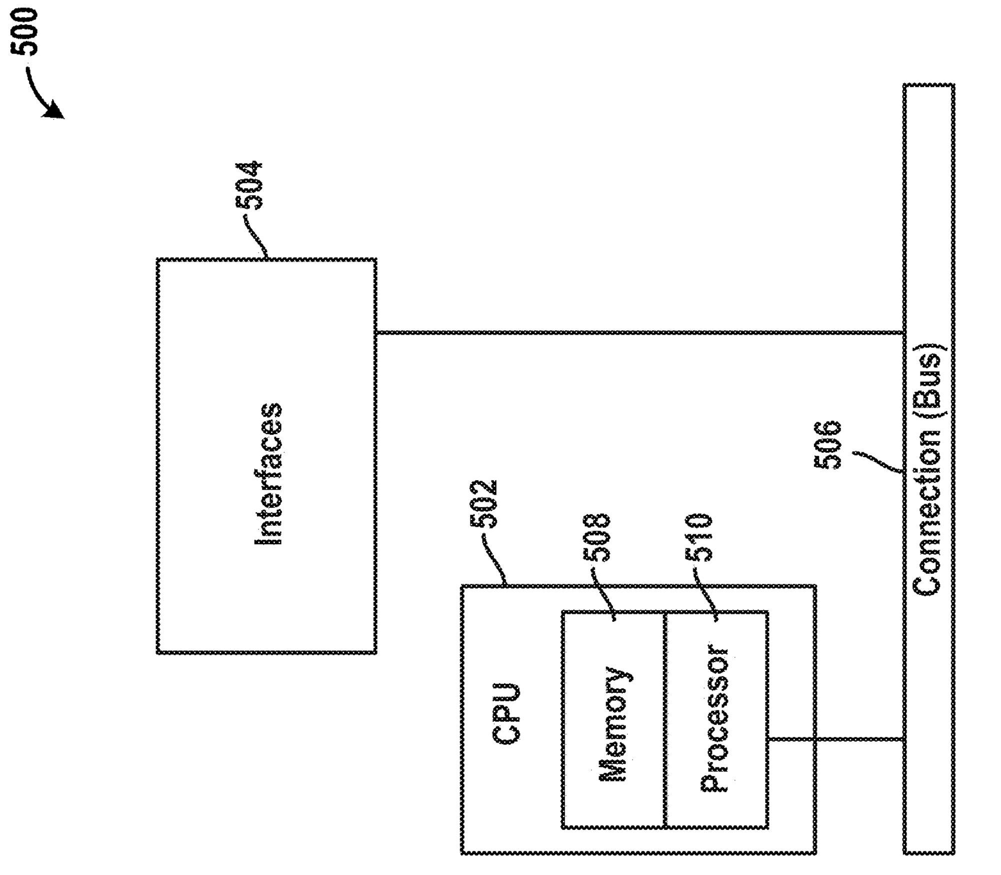
FIG. 5 illustrates an example of a network device according to some aspects of the present disclosure.

FIG. 5 illustrates an example of a network device, according to some aspects of the present disclosure. Network device 500 can be a network appliance implementing the functionalities of BGP and/or the provider edge devices (e.g., PEs 212, 214, 216, 218 shown in FIG. 2, PEs 330A-330E shown in FIGS. 3B-3F,), among other components described above with reference to FIGS. 1-4D, such as a controller or other device that implements functionalities of the MPLS network or SR-MPLS network (e.g., MPLS network 162 shown in FIG. 1, MPLS/SR-MPLS network 220 shown in FIG. 2, MPLS/SR-MPLS network 302 shown in FIGS. 3B-3F). The network device 500 can include a master central processing unit (CPU) 502, interfaces 504, and a bus 506 (e.g., a PCI bus). When acting under the control of appropriate software or firmware, the CPU 502 can be responsible for executing packet management, error detection, and/or routing functions. The CPU 502 preferably accomplishes all these functions under the control of software including an operating system and any appropriate applications software. The CPU 502 may include one or more processors 508 such as a processor from the Motorola family of microprocessors or the MIPS family of microprocessors. In an alternative embodiment, the processor 508 can be specially designed hardware for controlling the operations of the network device 500. In an embodiment, a memory 510 (such as non-volatile RAM and/or ROM) can also form part of the CPU 502. However, there are many different ways in which memory could be coupled to the system.

The interfaces 504 can be provided as interface cards (sometimes referred to as line cards). The interfaces 504 can control the sending and receiving of data packets over the network and sometimes support other peripherals used with the network device 500. Among the interfaces that may be provided are Ethernet interfaces, frame relay interfaces, cable interfaces, DSL interfaces, token ring interfaces, and the like. In addition, various very high-speed interfaces may be provided such as a fast token ring interface, wireless interface, Ethernet interface, Gigabit Ethernet interface, Asynchronous Transfer Mode (ATM) interface, High-Speed Serial Interface (HSSI), Packet Over SONET (POS) interface, Fiber Distributed Data Interface (FDDI), and the like. The interfaces 504 may include ports appropriate for communication with the appropriate media. In some cases, the interfaces 504 may also include an independent processor and, in some instances, volatile RAM. The independent processors may control communication intensive tasks such as packet switching, media control, and management. By providing separate processors for the communication intensive tasks, the interfaces 504 may allow the CPU 502 to efficiently perform routing computations, network diagnostics, security functions, and so forth.

Although the system shown in FIG. 5 is an example of a network device of an embodiment, it is by no means the only network device architecture on which the subject technology can be implemented. For example, an architecture having a single processor that can handle communications as well as routing computations and other network functions, can also be used. Further, other types of interfaces and media may also be used with the network device 500.

Regardless of the network device's configuration, it may employ one or more memories or memory modules (including the memory 510) configured to store program instructions for general-purpose network operations and mechanisms for roaming, route optimization, and routing functions described herein. The program instructions may control the operation of an operating system and/or one or more applications. The memory or memories may also be configured to store tables such as mobility binding, registration, and association tables.

Figure 6:
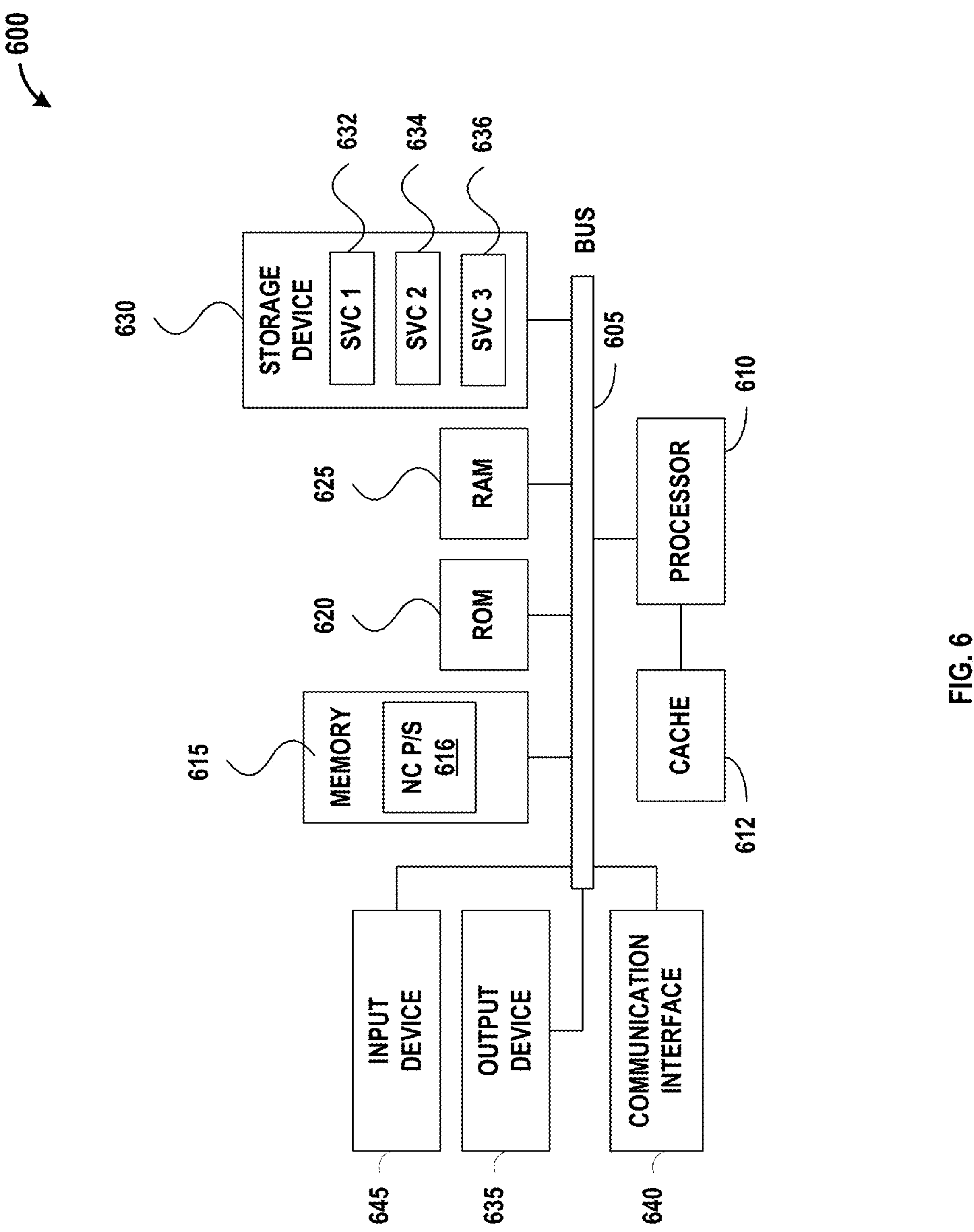
FIG. 6 illustrates an example of a bus computing system according to some aspects of the present disclosure.

FIG. 6 illustrates an example of a bus computing system, according to some aspects of the present disclosure. Computing system 600 can be utilized as part of any one of the network components described above with reference to FIGS. 1-4D. Further, aspects of computing system 600 can be employed to apply aspects of method 400 shown in FIGS. 4A-4D, which corresponds to various steps and functionalities outlined above with respect to FIGS. 3B-3F. Components of the computing system 600 are in electrical communication with each other using a bus 605. The computing system 600 can include a processing unit (CPU or processor) 610 and a system bus 605 that may couple various system components including the system memory 615, such as read only memory (ROM) 620 and random access memory (RAM) 625, to the processor 610. The computing system 600 can include a cache 612 of high-speed memory connected directly with, in close proximity to, or integrated as part of the processor 610. The computing system 600 can copy data from the memory 615, ROM 620, RAM 625, and/or storage device 630 to the cache 612 for quick access by the processor 610. In this way, the cache 612 can provide a performance boost that avoids processor delays while waiting for data. These and other modules can control the processor 610 to perform various actions. Other system memory 615 may be available for use as well. The memory 615 can include multiple different types of memory with different performance characteristics. The processor 610 can include any general purpose processor and a hardware module or software module (services), such as services SVC 1 732, SVC 2 634, and SVC 3 636 stored in the storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing system 600, an input device 645 can represent any number of input mechanisms, such as a microphone for speech, a touch-protected screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing system 600. The communications interface 640 can govern and manage the user input and system output. There may be no restriction on operating on any particular hardware arrangement and therefore the basic features here may easily be substituted for improved hardware or firmware arrangements as they are developed.

The storage device 630 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 630 can include the software SVCs 632, 634, and 636 for controlling the processor 610. Other hardware or software modules are contemplated. The storage device 630 can be connected to the system bus 605. In some embodiments, a hardware module that performs a particular function can include a software component stored in a computer-readable medium in connection with the necessary hardware components, such as the processor 610, bus 605, output device 635, and so forth, to carry out the function. In a further aspect, the memory 615 and/or the storage device 630 can also include network connection processes/services (abbreviated as NC P/S) 616 that includes instructions, which, when executed by the processor 610, cause the processor 610 to implement various functionalities discussed above and shown in FIGS. 3B-4D, including aspects of method 400.

For clarity of explanation, in some instances the various embodiments may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:

receiving, by a first provider edge router of a first autonomous system, a first join message destined for a multicast group member that is in a second autonomous system having a second provider edge router;

determining, whether a subscriber location is known;

in response to the determining, dropping, by the first provider edge router, the first join message;

transmitting, by the first provider edge router, a second join message to the second provider edge router over a segment route notifying the second provider edge router that a subscriber is joining a multicast group where a source is located on the second autonomous system serviced by the second provider edge router;

configuring the second provider edge router to periodically generate and transmit subsequent join messages to keep the subscriber in the multicast group; and recording, by the second provider edge router, the segment route through a network to the subscriber in the multicast group in a routing table on the second provider edge router.

2. The method of claim 1, further comprising:

determining, by the first provider edge router, that the subscriber location is unknown;

learning, by the first provider edge router, the subscriber location of the multicast group based on the first join message;

recording, by the first provider edge router, that the source for the multicast group is located in the second autonomous system; and recording, by the first provider edge router, the segment route through the network to the subscriber of the multicast group in the routing table on the first provider edge router.

3. The method of claim 1, further comprising:

determining, by the first provider edge router, that the subscriber location is known;

determining, by the first provider edge router, that a location of the source of the multicast group is unknown;

learning, by the first provider edge router, the location of the source of the multicast group using a border gateway protocol; and recording, by the first provider edge router, the segment route through the network to the source in the multicast group in the routing table on the first provider edge router.

4. The method of claim 1, further comprising:

determining, by the first provider edge router, that the subscriber location is known; and determining, by the first provider edge router, that a location of the source of the multicast group is known and is recorded in the routing table on the first provider edge router.

5. The method of claim 1, further comprising:

receiving, by the first provider edge router of the first autonomous system, wherein the first provider edge router has been configured as a first multicast router proxy, a first multicast maintenance message destined for the multicast group member that is in the second autonomous system having the second provider edge router;

dropping, by the first provider edge router, the first multicast maintenance message; and generating and transmitting, by the second provider edge router, a second multicast maintenance message to the multicast group member, wherein the second multicast maintenance message is a substitute for the first multicast maintenance message.

6. The method of claim 1, further comprising:

receiving, by the first provider edge router of the first autonomous system, a multicast content message;

determining, by the first provider edge router, the subscriber to the multicast group to receive the multicast content message; and forwarding, by the first provider edge router, the multicast content message to the subscriber to the multicast group using a respective segment route associated with the subscriber to the multicast group.

7. The method of claim 1, wherein the first provider edge router configured as a first multicast router proxy.

8. The method of claim 1, further comprising:

dropping, by the second provider edge router, the second join message; and generating and transmitting, by the second provider edge router, a third join message to the multicast group member, wherein the third join message is a substitute for the second join message.

9. The method of claim 1, wherein the network is a multi-protocol label switching (MLPS) network.

10. A system comprising:

one or more processors; and one or more memories, storing instructions, which when executed by the one or more processors, cause the system to:

receive, by a first provider edge router of a first autonomous system, a first join message destined for a multicast group member that is in a second autonomous system having a second provider edge router;

determine, whether a subscriber location is known;

in response to the determining, dropping, by the first provider edge router, the first join message;

transmit, by the first provider edge router, a second join message to the second provider edge router over a segment route notifying the second provider edge router that a subscriber is joining a multicast group where a source is located on the second autonomous system serviced by the second provider edge router;

configure the second provider edge router to periodically generate and transmit subsequent join messages to keep the subscriber in the multicast group; and record, by the second provider edge router, the segment route through a network to the subscriber in the multicast group in a routing table on the second provider edge router.

11. The system of claim 10, further comprising instructions, which when executed causes the system to:

determine, by the first provider edge router, that the subscriber location is unknown;

learn, by the first provider edge router, the subscriber location of the multicast group based on the first join message;

record, by the first provider edge router, that the source for the multicast group is located in the second autonomous system; and record, by the first provider edge router, the segment route through the network to the subscriber of the multicast group in the routing table on the first provider edge router.

12. The system of claim 10, further comprising instructions, which when executed causes the system to:

determine, by the first provider edge router, that the subscriber location is known;

determine, by the first provider edge router, that a location of the source of the multicast group is unknown;

learn, by the first provider edge router, the location of the source of the multicast group using a border gateway protocol; and record, by the first provider edge router, the segment route through the network to the source in the multicast group in the routing table on the first provider edge router.

13. The system of claim 10, further comprising instructions, which when executed causes the system to:

determine, by the first provider edge router, that the subscriber location is known; and determine, by the first provider edge router, that a location of the source of the multicast group is known and is recorded in the routing table on the first provider edge router.

14. The system of claim 10, further comprising instructions, which when executed causes the system to:

receive, by the first provider edge router of the first autonomous system, wherein the first provider edge router has been configured as a first multicast router proxy, a first multicast maintenance message destined for the multicast group member that is in the second autonomous system having the second provider edge router;

drop, by the first provider edge router, the first multicast maintenance message; and generate and transmit, by the second provider edge router, a second multicast maintenance message to the multicast group member, wherein the second multicast maintenance message is a substitute for the first multicast maintenance message.

15. The system of claim 10, further comprising instructions, which when executed causes the system to:

receive, by the first provider edge router of the first autonomous system, a multicast content message;

determine, by the first provider edge router, the subscriber to the multicast group to receive the multicast content message; and forward, by the first provider edge router, the multicast content message to the subscriber to the multicast group using a respective segment route associated with the subscriber to the multicast group.

16. The system of claim 10, wherein the first provider edge router configured as a first multicast router proxy.

17. The system of claim 10, further comprising instructions, which when executed causes the system to:

drop, by the second provider edge router, the second join message; and generate and transmit, by the second provider edge router, a third join message to the multicast group member, wherein the third join message is a substitute for the second join message.

18. The system of claim 10, wherein the network is a multi-protocol label switching (MLPS) network.

19. One or more non-transitory computer-readable mediums storing instructions, which when executed by one or more processors, cause a system to:

receive, by a first provider edge router of a first autonomous system, a first join message destined for a multicast group member that is in a second autonomous system having a second provider edge router;

determine, whether a subscriber location is known;

in response to the determining, dropping, by the first provider edge router, the first join message;

transmit, by the first provider edge router, a second join message to the second provider edge router over a segment route notifying the second provider edge router that a subscriber is joining a multicast group where a source is located on the second autonomous system serviced by the second provider edge router;

configure the second provider edge router to periodically generate and transmit subsequent join messages to keep the subscriber in the multicast group; and record, by the second provider edge router, the segment route through a network to the subscriber in the multicast group in a routing table on the second provider edge router.

20. The one or more non-transitory computer-readable mediums of claim 19, further comprising instructions, which when executed causes the system to:

determine, by the first provider edge router, that the subscriber location is unknown;

learn, by the first provider edge router, the subscriber location of the multicast group based on the first join message;

record, by the first provider edge router, that the source for the multicast group is located in the second autonomous system; and record, by the first provider edge router, the segment route through the network to the subscriber of the multicast group in the routing table on the first provider edge router.

* * * * *